(12) United States Patent
Blackshaw et al.

(10) Patent No.: US 8,271,316 B2
(45) Date of Patent: Sep. 18, 2012

(54) CONSUMER TO BUSINESS DATA CAPTURING SYSTEM

(75) Inventors: Peter E. Blackshaw, Cincinnati, OH (US); Daniel M. Coates, Mason, OH (US); Olivier Fischer, Cincinnati, OH (US); Michael C. Kunz, Cincinnati, OH (US)

(73) Assignee: Buzzmetrics Ltd, Herzlia Pitusch (IL)

( * ) Notice: Subject to any disclaimer, the term of this patent is extended or adjusted under 35 U.S.C. 154(b) by 1815 days.

(21) Appl. No.: 11/346,589

(22) Filed: Feb. 2, 2006

(65) Prior Publication Data

US 2006/0253316 A1 Nov. 9, 2006

Related U.S. Application Data

(62) Division of application No. 09/695,016, filed on Oct. 23, 2000, now abandoned.

(60) Provisional application No. 60/172,393, filed on Dec. 17, 1999.

(51) Int. Cl.
 *G06Q 10/00* (2012.01)
(52) U.S. Cl. ............... 705/7.29; 705/7.33; 705/7.31
(58) Field of Classification Search ............ 705/7.29, 705/7.31, 7.33, 7.32
See application file for complete search history.

(56) References Cited

U.S. PATENT DOCUMENTS

| | | | |
|---|---|---|---|
| 3,950,618 A | 4/1976 | Bloisi | |
| 5,041,972 A | 8/1991 | Frost | |
| 5,077,785 A | 12/1991 | Monson | |
| 5,124,911 A | 6/1992 | Sack | |
| 5,301,109 A | 4/1994 | Landauer et al. | |
| 5,317,507 A | 5/1994 | Gallant | |
| 5,321,833 A | 6/1994 | Chang et al. | |
| 5,371,673 A | 12/1994 | Fan | |
| 5,495,412 A | 2/1996 | Thiessen | |
| 5,519,608 A | 5/1996 | Kupiec | |
| 5,537,618 A | 7/1996 | Boulton et al. | |
| 5,659,732 A | 8/1997 | Kirsch | |
| 5,659,742 A | 8/1997 | Beattie et al. | |
| 5,668,953 A | 9/1997 | Sloo | |
| 5,671,333 A | 9/1997 | Catlett et al. | |
| 5,675,710 A | 10/1997 | Lewis | |

(Continued)

FOREIGN PATENT DOCUMENTS

WO 00/17824 3/2000

OTHER PUBLICATIONS www.zagat.com (Internet Archived from May 1999) attached as Zagat Archived.pdf (p. 1-22).*

(Continued)

*Primary Examiner* — Beth V Boswell
*Assistant Examiner* — Adrian McPhillip
(74) *Attorney, Agent, or Firm* — Hanley, Flight & Zimmerman, LLC

(57) ABSTRACT

Methods and apparatus of the present invention collect data associated with a consumer through generation of a consumer feedback communication via a wide area network. A business to which the consumer feedback communication is directed is identified in response to input from a consumer via the wide area network. Feedback data relating to the business is obtained from the consumer via the wide area network. At least a portion of the consumer feedback communication is automatically generated using the feedback data. Data associated with the consumer is then collected from the obtained feedback data.

26 Claims, 21 Drawing Sheets

U.S. PATENT DOCUMENTS

| | | | |
|---|---|---|---|
| 5,696,962 A | 12/1997 | Kupiec | |
| 5,721,721 A * | 2/1998 | Yanagisawa et al. | 369/126 |
| 5,794,412 A | 8/1998 | Ronconi | |
| 5,819,285 A | 10/1998 | Damico et al. | |
| 5,822,744 A | 10/1998 | Kesel | |
| 5,836,771 A | 11/1998 | Ho et al. | |
| 5,845,278 A | 12/1998 | Kirsch et al. | |
| 5,857,179 A | 1/1999 | Vaithyanathan et al. | |
| 5,884,302 A | 3/1999 | Ho | |
| 5,895,450 A | 4/1999 | Sloo | |
| 5,911,043 A | 6/1999 | Duffy et al. | |
| 5,920,854 A | 7/1999 | Kirsch et al. | |
| 5,924,094 A | 7/1999 | Sutter | |
| 5,950,172 A * | 9/1999 | Klingman | 705/27.1 |
| 5,950,189 A | 9/1999 | Cohen et al. | |
| 5,953,718 A | 9/1999 | Wical | |
| 5,974,412 A | 10/1999 | Halehurst et al. | |
| 5,983,214 A | 11/1999 | Lang et al. | |
| 5,983,216 A | 11/1999 | Kirsch et al. | |
| 5,999,908 A * | 12/1999 | Abelow | 705/7.32 |
| 6,006,221 A | 12/1999 | Liddy et al. | |
| 6,012,053 A | 1/2000 | Pant et al. | |
| 6,021,409 A | 2/2000 | Burrows | |
| 6,026,387 A | 2/2000 | Kesel | |
| 6,026,388 A | 2/2000 | Liddy et al. | |
| 6,029,161 A | 2/2000 | Lang et al. | |
| 6,029,195 A | 2/2000 | Herz | |
| 6,032,145 A | 2/2000 | Beall et al. | |
| 6,035,294 A | 3/2000 | Fish | |
| 6,038,610 A | 3/2000 | Belfiore et al. | |
| 6,064,980 A | 5/2000 | Jacobi et al. | |
| 6,067,539 A | 5/2000 | Cohen | |
| 6,078,892 A | 6/2000 | Anderson et al. | |
| 6,094,657 A | 7/2000 | Hailpern et al. | |
| 6,098,066 A | 8/2000 | Snow et al. | |
| 6,112,203 A | 8/2000 | Bharat et al. | |
| 6,119,933 A | 9/2000 | Wong | |
| 6,138,113 A | 10/2000 | Dean et al. | |
| 6,138,128 A | 10/2000 | Perkowitz et al. | |
| 6,169,986 B1 | 1/2001 | Bowman et al. | |
| 6,185,558 B1 | 2/2001 | Bowman et al. | |
| 6,192,360 B1 | 2/2001 | Dumais et al. | |
| 6,202,068 B1 | 3/2001 | Kraay et al. | |
| 6,233,575 B1 | 5/2001 | Agrawal | |
| 6,236,977 B1 | 5/2001 | Verba et al. | |
| 6,236,987 B1 | 5/2001 | Horowitz et al. | |
| 6,236,991 B1 | 5/2001 | Frauenhofer et al. | |
| 6,260,041 B1 | 7/2001 | Gonzalez | |
| 6,266,664 B1 | 7/2001 | Russell-Falla et al. | |
| 6,269,362 B1 | 7/2001 | Broder et al. | |
| 6,278,990 B1 | 8/2001 | Horowitz | |
| 6,289,342 B1 | 9/2001 | Lawrence et al. | |
| 6,304,864 B1 | 10/2001 | Liddy et al. | |
| 6,308,176 B1 | 10/2001 | Bagshaw | |
| 6,314,420 B1 | 11/2001 | Lang et al. | |
| 6,334,131 B2 | 12/2001 | Chakrabarti et al. | |
| 6,360,215 B1 | 3/2002 | Judd et al. | |
| 6,362,837 B1 | 3/2002 | Ginn | |
| 6,366,908 B1 | 4/2002 | Chong et al. | |
| 6,377,946 B1 | 4/2002 | Okamoto et al. | |
| 6,385,586 B1 | 5/2002 | Dietz | |
| 6,393,460 B1 | 5/2002 | Gruen et al. | |
| 6,401,118 B1 | 6/2002 | Thomas | |
| 6,411,936 B1 | 6/2002 | Sanders | |
| 6,418,433 B1 | 7/2002 | Chakrabarti et al. | |
| 6,421,675 B1 | 7/2002 | Ryan et al. | |
| 6,434,549 B1 | 8/2002 | Linetsky et al. | |
| 6,493,703 B1 | 12/2002 | Knight et al. | |
| 6,507,866 B1 | 1/2003 | Barchi | |
| 6,513,032 B1 | 1/2003 | Sutter | |
| 6,519,631 B1 | 2/2003 | Rosenschein et al. | |
| 6,526,440 B1 | 2/2003 | Bharat | |
| 6,539,375 B2 | 3/2003 | Kawasaki | |
| 6,546,390 B1 | 4/2003 | Pollack et al. | |
| 6,571,234 B1 | 5/2003 | Knight et al. | |
| 6,571,238 B1 | 5/2003 | Pollack et al. | |
| 6,574,614 B1 | 6/2003 | Kesel | |
| 6,584,470 B2 | 6/2003 | Veale | |
| 6,606,644 B1 | 8/2003 | Ford et al. | |
| 6,622,140 B1 | 9/2003 | Kantrowitz | |
| 6,640,218 B1 | 10/2003 | Golding et al. | |
| 6,651,056 B2 * | 11/2003 | Price et al. | 707/727 |
| 6,651,086 B1 | 11/2003 | Manber et al. | |
| 6,654,813 B1 | 11/2003 | Black et al. | |
| 6,658,389 B1 | 12/2003 | Alpdemir | |
| 6,671,061 B1 * | 12/2003 | Joffe et al. | 358/1.15 |
| 6,708,215 B1 | 3/2004 | Hingorani et al. | |
| 6,721,734 B1 | 4/2004 | Subasic et al. | |
| 6,751,606 B1 | 6/2004 | Fries et al. | |
| 6,751,683 B1 | 6/2004 | Johnson et al. | |
| 6,757,646 B2 | 6/2004 | Marchisio | |
| 6,772,141 B1 | 8/2004 | Pratt et al. | |
| 6,775,664 B2 | 8/2004 | Lang et al. | |
| 6,778,975 B1 | 8/2004 | Anick et al. | |
| 6,782,393 B1 | 8/2004 | Balabanovic et al. | |
| 6,795,826 B2 | 9/2004 | Flinn et al. | |
| 6,807,566 B1 | 10/2004 | Bates et al. | |
| 6,928,526 B1 | 8/2005 | Zhu et al. | |
| 6,978,292 B1 | 12/2005 | Murakami et al. | |
| 6,983,320 B1 | 1/2006 | Thomas | |
| 6,999,914 B1 | 2/2006 | Boerner et al. | |
| 7,146,416 B1 | 12/2006 | Yoo et al. | |
| 7,188,078 B2 | 3/2007 | Arnett et al. | |
| 7,188,079 B2 | 3/2007 | Arnett et al. | |
| 7,197,470 B1 | 3/2007 | Arnett et al. | |
| 2001/0042087 A1 | 11/2001 | Kephart et al. | |
| 2002/0032772 A1 | 3/2002 | Olstad et al. | |
| 2002/0059258 A1 | 5/2002 | Kirkpatrick | |
| 2002/0087515 A1 | 7/2002 | Swannack | |
| 2002/0123988 A1 | 9/2002 | Dean et al. | |
| 2002/0133481 A1 | 9/2002 | Smith et al. | |
| 2002/0159642 A1 | 10/2002 | Whitney | |
| 2003/0070338 A1 | 4/2003 | Roshkoff | |
| 2004/0024752 A1 | 2/2004 | Manber et al. | |
| 2004/0054737 A1 * | 3/2004 | Daniell | 709/206 |
| 2004/0059708 A1 | 3/2004 | Dean et al. | |
| 2004/0059729 A1 | 3/2004 | Krupin et al. | |
| 2004/0078432 A1 | 4/2004 | Manber et al. | |
| 2004/0111412 A1 | 6/2004 | Broder | |
| 2004/0122811 A1 | 6/2004 | Page | |
| 2004/0199498 A1 | 10/2004 | Kapur et al. | |
| 2004/0205482 A1 | 10/2004 | Basu et al. | |
| 2004/0210561 A1 | 10/2004 | Shen | |
| 2005/0049908 A2 | 3/2005 | Hawks | |
| 2005/0114161 A1 | 5/2005 | Garg | |
| 2005/0125216 A1 | 6/2005 | Chitrapura et al. | |
| 2005/0154686 A1 | 7/2005 | Corston et al. | |
| 2005/0209907 A1 * | 9/2005 | Williams | 705/10 |
| 2006/0004691 A1 | 1/2006 | Sifry et al. | |
| 2006/0041605 A1 | 2/2006 | King et al. | |
| 2006/0069589 A1 | 3/2006 | Nigam et al. | |
| 2006/0173819 A1 | 8/2006 | Watson | |
| 2006/0173837 A1 | 8/2006 | Berstis et al. | |
| 2006/0206505 A1 | 9/2006 | Hyder et al. | |
| 2007/0027840 A1 | 2/2007 | Cowling et al. | |

OTHER PUBLICATIONS

Soderlund et al., "Customer Satisfaction and Links to Customer Profitability: An Empirical Examination of the Association Between Attitudes and Behavior," Published Jan. 1999, Accessed Nov. 5, 2010, attached as Word of Mouth.pdf (p. 1-22).*

Notice of Allowance issued in U.S. Appl. No. 11/651,661, mailed May 19, 2009, 29 pages.

Notice of Allowance issued in U.S. Appl. No. 11/517,417, mailed May 29, 2009, 7 pages.

Notice of Allowance issued in U.S. Appl. No. 11/710,742, mailed Jun. 8, 2009, 10 pages.

Office Action issued in U.S. Appl. No. 10/801,758, mailed Apr. 29, 2009, 42 pages.

Office Action issued in U.S. Appl. No. 09/879,220, mailed Dec. 2, 2004, 15 pages.

Office Action issued in U.S. Appl. No. 09/879,220, mailed Apr. 28, 2005, 16 pages.

Office Action issued in U.S. Appl. No. 09/879,220, mailed Mar. 28, 2006, 19 pages.

Notice of Allowance issued in U.S. Appl. No. 09/879,220, mailed Dec. 1, 2006, 3 pages.
Office Action issued in U.S. Appl. No. 11/239,632, mailed Apr. 5, 2006, 9 pages.
Notice of Allowance issued in U.S. Appl. No. 11/239,632, mailed Sep. 21, 2006, 3 pages.
Notice of Allowance issued in U.S. Appl. No. 11/239,632, mailed Dec. 18, 2006, 3 pages.
Office Action issued in U.S. Appl. No. 11/710,743, mailed Jul. 29, 2008, 12 pages.
Office Action issued in U.S. Appl. No. 11/710,743, mailed Jan. 12, 2009, 17 pages.
Office Action issued in U.S. Appl. No. 11/710,743, mailed Jan. 8, 2010, 23 pages.
Office Action issued in U.S. Appl. No. 09/686,516, mailed Jan. 28, 2005, 19 pages.
Office Action issued in U.S. Appl. No. 09/686,516, mailed Jun. 29, 2005, 21 pages.
Office Action issued in U.S. Appl. No. 09/686,516, mailed Nov. 22, 2005, 25 pages.
Office Action issued in U.S. Appl. No. 09/686,516, mailed May 10, 2006, 34 pages.
Notice of Allowance issued in U.S. Appl. No. 09/686,516, mailed Jan. 24, 2007, 3 pages.
Office Action issued in U.S. Appl. No. 11/239,696, mailed Sep. 22, 2006, 11 pages.
Office Action issued in U.S. Appl. No. 11/239,696, mailed Sep. 12, 2007, 8 pages.
Notice of Allowance issued in U.S. Appl. No. 11/239,696, mailed Nov. 21, 2007, 3 pages.
Office Action issued in U.S. Appl. No. 11/239,695, mailed Apr. 7, 2006, 9 pages.
Notice of Allowance issued in U.S. Appl. No. 11/239,695, mailed Sep. 21, 2006, 3 pages.
Notice of Allowance issued in U.S. Appl. No. 11/239,695, mailed Dec. 13, 2006, 3 pages.
Office Action issued in U.S. Appl. No. 11/710,742, mailed Oct. 3, 2007, 10 pages.
Office Action issued in U.S. Appl. No. 11/710,742, mailed Aug. 7, 2008, 12 pages.
Notice of Allowance issued in U.S. Appl. No. 11/710,742, mailed Dec. 8, 2008, 10 pages.
Notice of Allowance issued in U.S. Appl. No. 11/710,742, mailed Jan. 30, 2009, 10 pages.
Office Action issued in U.S. Appl. No. 11/710,742, mailed Jan. 5, 2010, 9 pages.
Notice of Allowance issued in U.S. Appl. No. 11/245,542, mailed Aug. 21, 2008, 4 pages.
Office Action issued in U.S. Appl. No. 11/651,661, mailed Aug. 3, 2007, 14 pages.
Office Action issued in U.S. Appl. No. 11/651,661, mailed Jun. 4, 2008, 11 pages.
Office Action issued in U.S. Appl. No. 11/651,661, mailed Dec. 4, 2008, 10 pages.
Office Action issued in U.S. Appl. No. 11/651,661, mailed May 6, 2009, 2 pages.
Office Action issued in U.S. Appl. No. 11/517,418, mailed Aug. 19, 2008, 9 pages.
Office Action issued in U.S. Appl. No. 11/364,169, mailed Jun. 11, 2007, 8 pages.
Office Action issued in U.S. Appl. No. 11/364,169, mailed Apr. 23, 2008, 10 pages.
Advisory Action issued in U.S. Appl. No. 11/364,169, mailed Jul. 10, 2008, 2 pages.
Office Action issued in U.S. Appl. No. 11/454,301, mailed Sep. 18, 2008, 17 pages.
Office Action issued in U.S. Appl. No. 11/454,301, mailed Apr. 7, 2009, 17 pages.
Office Action issued in U.S. Appl. No. 10/801,758, mailed Mar. 7, 2008, 31 pages.
Office Action issued in U.S. Appl. No. 10/801,758, mailed Oct. 1, 2008, 40 pages.
Office Action issued in U.S. Appl. No. 11/897,984, mailed May 22, 2008, 17 pages.
Office Action issued in U.S. Appl. No. 11/897,984, mailed Nov. 13, 2008, 20 pages.
Advisory Action issued in U.S. Appl. No. 11/897,984, mailed Jan. 21, 2009, 3 pages.
Office Action issued in U.S. Appl. No. 11/897,984, mailed Apr. 21, 2009, 18 pages.
Office Action issued in U.S. Appl. No. 11/245,542, mailed Oct. 9, 2007, 11 pages.
Office Action issued in U.S. Appl. No. 11/245,542, mailed Jun. 12, 2008, 9 pages.
U.S. Office Action, issued in U.S. Appl. No. 11/710,743, mailed Aug. 7, 2009, 19 pages.
Reguly, Eric. "Caveat Emptor Rules on the Internet." The Globe and Mail (Canada): Report on Business Column, p. B2, Apr. 10, 1999.
Notice of Allowance issued in U.S. Appl. No. 11/245,542, mailed Oct. 8, 2008.
Notice of Allowance issued in U.S. Appl. No. 11/245,542, mailed Dec. 16, 2008.
Office Action issued in U.S. Appl. No. 11/517,417, mailed Dec. 17, 2008.
International Preliminary Report on Patentability issued in PCT US2007 021035, date mailed Mar. 31, 2009, 9 pages.
International Search Report dated Jul. 1, 2008, in WO PCT/US2007/021035, 3 pages.
Office Action issued in U.S. Appl. No. 09/695,016, mailed Jul. 21, 2004.
Office Action issued in U.S. Appl. No. 09/695,016, mailed May 19, 2005.
Office Action issued in U.S. Appl. No. 09/695,016, mailed Nov. 2, 2005.
Office Action issued in U.S. Appl. No. 09/796,961, mailed Feb. 24, 2003.
IPRP dated Jun. 19, 2007, in WO PCT/US2005/035321, 4 pages.
Office Action issued in U.S. Appl. No. 11/372,191, mailed Dec. 23, 2008.
Office Action issued in U.S. Appl. No. 11/897,984, mailed Oct. 7, 2009.
Office Action issued in U.S. Appl. No. 11/897,984, mailed Jan. 21, 2009.
Notice of Allowance issued in U.S. Appl. No. 10/801,758, mailed Jan. 6, 2010, 10 pages.
Thomas, International Marketing, 1971, International Textbook Company, Scranton, PA, p. 148.
Kleppner, Advertising Procedure, 6th Edition, 1977, Prentice-Hall, Inc., Englewood Cliffs, NJ, p. 492.
Tull el al, Marketing Research Measurement and Method, 1984, MacMillan Publishing Company, New York, NY, pp. 102, 103, 114, 115, 200, 201 and 256.
Dillon et al, Marketing Research in a Marketing Environment, 1987, Times Mirror/Mosby College, USA, pp. 98, 286, 288.
Kotler, Marketing Management, 1997, PrenticeHall International Inc., Upper Saddle River, NJ, pp. 617-619, 656-658, 665-667.
Archived version of www.bizrate.com, Jan. 1999.
p. 34 of archived version of www.zagat.com, Feb. 1999.
www.zagat.com archived on Apr. 29, 1999.
Reinartz, Customer Lifetime Value Analysis: An Integrated Empirical Framework for Measurement and Explanation, dissertation: Apr. 1999, pp. 57-118.
www.dialogic.com as archived on May 12, 2000.
Adamic et al., The political blogosphere and the 2004 U.S. election: Divided they blog, Proceedings WWW-2005 2nd Annual Workshop on the Weblogging Ecosystem, 2005, Chiba, Japan.
Adar et al., Implicit structure and dynamics of blogspace, Proceedings WWW-2004 Workshop on the Weblogging Ecosystem, 2004, New York, NY.
Aliod, Diego Molla, et al., "A Real World Implementation of Answer Extraction", Department of Computer Science, University of Zurich, Winterthurerstr, 1998, 190, CH-8057 Zurich, Switzerland, pp. 1-6.
Bishop, Mike, "ARROW Question/Answering Systems", Language Computer Corporation, 1999, pp. 1-3.

Blum, Avrim, "Empirical support for winow and weighted-majority algorithms: Results on a calendar scheduling domain," in Machine Learning, 1997, pp. 5-23, vol. 26, Kluwer Academic Publishers, Boston, USA.

Bournellis, Cynthia, "Tracking the hits on Web Sites", Communications International. London: Sep. 1995. vol. 22, Issue 9, 3 pages.

Cohen, William W., "Data Integration using similarity joins and a word-based information representation language," in ACM Transactions on Information Systems, Jul. 2000, pp. 288-321, vol. 18, No. 3.

Cohn et al., "Active Learning with Statistical Models", Journal of Artificial Intelligence Research 4 (1996), 129-145, AI Access Foundation and Morgan Kaufmann Publishers, USA.

Dagan et al., "Mistake Driven learning in text categorization," in EMNLP '97, 2nd Conference on Empirical Methods in Natural Language Processing, 1997.

Delahaye Group to Offer Net Bench: High Level Web-Site Qualitative Analysis and Reporting; Netbench Builds on Systems provided by I/PRO and Internet Media Services, 1995 business Wire, Inc., May 31, 1995, 3 pages.

eWatch's archived web site retrieved from [URL:http://web.archive.org/web/19980522190526/wwww.ewatch.com] on Sep. 8, 2004, archived May 22, 1998.

Farber, Dave. "IP: eWatch and Cybersleuth," Jun. 29, 2000, retrieved from [URL: http://www.interesting-people.org/archives/interesting-people/200006/msg00090.html].

Freund et al., "Selective Sampling Using the Query by Committee Algorithm", Machine Learning 28 (1997), 133-168, Kluwer Academic Publishers, The Netherlands.

Glance et al., Analyzing online disussion for marketing intelligence, Proceedings WWW-2005 2nd Annual Workshop on the Weblogging Ecosystem, 2005, Chiba, Japan.

Glance et al., Deriving marketing intelligence from online discussion, 11th ACM SIGKDD International Conf. on Knowledge Discovery and Data Mining, Aug. 21-24, 2005, Chicago, IL.

Greffenstette et al., "Validating the coverage of lexical resources for affect analysis and automatically classifying new words along semantic axes," Chap. X, Mar. 2004, pp. 1-15.

Harabagiu, Sanda M., "An Intelligent System for Question Answering", University of Southern California; Modlovan, Dan, Southern Methodist University, 2004, pp. 1-5.

Harabagiu, Sanda M. et al., "Experiments with Open-Domain Textual Question Asnwering", Department of Computer Science and Engineering at Southern Methodist Universtity 2000, pp. 1-7.

Harabagiu, Sanda M. et al., "Mining Textual Answers with Knowledge-Based Indicators", Department of Computer Science and Engineering at Southern Methodist University, 2000, pp. 1-5.

Joachims, Thorsten, "Text categorization with support vector machines: Learning with many relevant features," in Machine Learning: ECML-98, Tenth European Conference on Machine Learning, pp. 137-142, 1998.

Kahn et al., Categorizing Web Documents using Competitive Learning;An ingredient of a Personal Adaptive Agent, IEEE;c 1997.

Katz, Boris, "From Sentence Processing to Information Access on the World Wide Web: START Information Server", MIT Artificial Intelligence Laboratory, Feb. 27, 1997.

Lenz, Mario, et al., "Question answering with Textual CBR", Department of Computer Science, Humboldt University Berlin, D-10099 Berlin, pp. 1-12, 1998.

Littlestone, Nick, "Learning quickly when irrelevant attributes abound: A new linear-threshold algorithm," in Machine Learning, 1988, pp. 285-318, vol. 2, Kluwer Academic Publishers, Boston, USA.

Marlow, Audience, structure and authority in the weblog community, International Communication Association Conference, MIT Media Laboratory, 2004, New Orleans, LA.

McCallum et al., "Text Classification by Bootstrapping with the Keywords, EM and Shrinkage", Just Research and Carnegie Mellon U., circa 1999, Pittsburgh, PA, USA.

McLachlan, Geoffrey J. and Krishnan, Thriyambakam, The EM Algorithm and Extensions, Copyright 1997, pp. 1-274, John Wiley & Sons, Inc., New York, USA.

Modlovan, Dan et al., "LASSO: A Tool for Surfing the Answer Net", Department of Computer Science and Engineering at Southern Methodist University, pp. 1-9, 1999.

Nakashima et al., Information Filtering for the Newspaper, IEE; c1997.

Nanno et al., Automatic collection and monitoring of Japanese Weblogs, Proceedings WWW-2004 Workshop on the weblogging Ecosystem, 2004, New York, NY.

NetCurrent's web site, retrieved from [URL: http://web.archive.org/web/20000622024845/www/netcurrents.com] Jan. 17, 2005, archived on Jun. 22, 2000 and Sep. 18, 2000.

Pang et al., "Thumbs up? Sentiment classification using machine learning techniques," in Proceedings of EMNLP 2002,2002.

Trigaux, Robert. "Cyberwar Erupts Over Free Speech Across Florida, Nation." Knight-Ridder Tribune Business News, May 29, 2000.

Voorhees, Ellen M., "The TREC-8 Question Answering Track Report", National Institute of Standards and Technology, pp. 1-6, 1999.

Wiebe et al., "Identifying collocations for recognizing opinions, in proceedings of ACL/EACL '01 workshop on collcation," (Toulouse, France), Jul. 2001.

Word of Mouth Research Case Study, "The Trans Fat Issue, Analysis of online consumer conversation to understand hwo the Oreo lawsuit impacted word-of-mouth on trans fats.", Aug. 16, 2004, 35 pages.

Yang, Yiming, "An evaluation of statistical approacches to text categorization," Information Retrieval 1 (1/2), pp. 67-88, 1999.

International Bureau, "International Preliminary Report on Patentability", from corresponding International Patent Application No. PCT/IL2006/000905, mailed on Jul. 2, 2007, (5 pages).

* cited by examiner

CONSUMER TO BUSINESS DATA CAPTURING SYSTEM

CROSS-REFERENCE TO RELATED APPLICATIONS

This application is a divisional of U.S. patent application Ser. No. 09/695,016, filed Oct. 23, 2000 now abandoned, which is hereby incorporated by reference for all purposes, and which claims priority of U.S. Provisional Application No. 60/172,393, entitled "METHODS AND APPARATUS FOR COLLECTING AND MANAGING CONSUMER FEEDBACK VIA A WIDE AREA NETWORK", filed on Dec. 17, 1999, which is hereby incorporated by reference for all purposes.

BACKGROUND OF THE INVENTION

1. Field of the Invention

The present invention relates to a letter composition and delivery system. More particularly, the present invention relates to letter composition and delivery as well as collection and interpretation of data obtained via the letter composition and delivery process.

2. Description of the Related Art

In today's highly commercialized society, consumers are offered seemingly unlimited choices. While it may seem that this diversity of products and services only serves to benefit consumers, consumers often have a difficult time selecting among the vast assortment of options available to them. Today's consumer is bombarded by advertisements while driving, watching television, listening to the radio, and even while surfing the Internet. However, the information typically provided in such advertisements is sorely inadequate. Thus, even when a consumer expends an enormous amount of money on an item or service, the consumer's selection is often made based upon very limited information. Although a consumer's individual experience with regard to a particular product or service is a potential source of valuable information to other consumers, it is difficult if not impossible to disseminate this information to a wide range of consumers or potential consumers. It would therefore be beneficial if consumers could benefit from the very valuable experiences of other consumers. Accordingly, it would be desirable if consumers could communicate their opinions to other consumers and potential consumers.

In addition to having information accessible to make informed decisions, consumers often value the opportunity to communicate their opinions, questions and suggestions to businesses. However, writing a letter is a time-consuming process. Moreover, it is often difficult if not impossible to identify the appropriate individual within a business or company to whom a letter should be addressed. Another problem arises when the business is a foreign business and therefore conducts business in a language other than that spoken by the consumer. As a result, consumers are often discouraged from sending letters to businesses regarding good or bad experiences, suggestions, or questions. Even when a consumer does decide to send a letter to a company, it is often difficult to discern whether the letter was received by the business and therefore difficult to achieve resolution of the situation that prompted the letter. It would therefore be beneficial if a system could be established which would facilitate and track the composition and delivery of a letter to a business as the resolution of the situation that prompted the letter.

In order to successfully offer a wide variety of choices to today's consumer, businesses often expend large sums of money on advertisements and consumer research. Typically, businesses perform surveys to obtain valuable consumer opinions regarding the products or services offered by them. In addition, these businesses often purchase consumer information from sources such as organizations that independently perform such surveys. However, these surveys are not initiated by consumers and therefore are not likely to obtain information from those who might provide the most valuable feedback to businesses. Moreover, such surveys are tedious and time-consuming to complete. It would therefore be beneficial if a consumer could quickly and easily communicate his or her opinions and experiences to these businesses upon initiation by the consumer through a more sophisticated data gathering process than the traditional consumer survey. It is also important to note that the data obtained from such surveys is not typically made available to consumers. Thus, it would be desirable if a consumer could access information such as consumer ratings obtained as a result of such communications. Moreover, it would be desirable if such communications could be made in a manner so as to promote a response by the business to the consumer.

The Internet has recently become a popular information resource for even the most unsophisticated computer user. The popularity of the Internet as an information source is due, in part, to the vast amount of available information that can be downloaded by almost anyone having access to a computer and a modem. The Internet's strength also lies in its open-ended nature. These and other factors have caused an exponential increase in Internet to usage and with it, an exponential increase in the volume of information available. However, even with the vast amount of information and services available on the Internet, there fails to be an effective mechanism for facilitating the communication of information between consumers and businesses. In addition, businesses have seemingly failed to recognize the potential word of mouth influence a consumer has in view of the rising popularity of the Internet and electronic mail. It would therefore be desirable to leverage the power and accessibility of the Internet to facilitate the exchange of information among consumers and businesses.

In view of the foregoing, it would be desirable if a mechanism for facilitating communication from consumers to businesses could be established. Similarly, it would be beneficial if a counterpart mechanism could be established to promote responses from businesses to consumers in response to consumer communications. In addition, it would be beneficial if consumer data could be obtained through this communication process. Moreover, it would be desirable if these mechanisms could be implemented on the Internet to facilitate communication between consumers and businesses as well as the information gathering process.

SUMMARY OF THE INVENTION

The present invention enables a consumer feedback communication to be generated by consumers to transmit valuable feedback to businesses. Through this process, market research data related to the consumers may also be generated. Accordingly, the feedback and consumer related data may transmitted to businesses as well as entire industries, enabling the businesses to improve their business practices as well as resolve situations that prompted the generation of the feedback communication.

In accordance with one aspect of the invention, methods and apparatus of the present invention generate a consumer feedback communication via a wide area network. A business to which the consumer feedback communication is directed is identified in response to input from the consumer. Feedback data relating to the business is obtained from the consumer via the wide area network. At least a portion of the consumer feedback communication is automatically generated using the feedback data. The consumer feedback communication is addressed to an individual associated with the business. The consumer feedback communication is then transmitted to the individual.

It is important to note that the present invention enables market research data to be collected via a wide area network using consumer feedback flow from a plurality of individual consumers. Each of the consumer feedback flows includes feedback data associated with a consumer feedback communication addressed to at least one business, where the feedback data relates to at least one business. Market research data is then collected from the obtained feedback data associated with the consumer feedback flows received from the plurality of individual consumers.

In accordance with another aspect of the invention, methods and apparatus of the present invention provide accessibility to one or more consumer feedback communications previously sent by a consumer to one or more businesses and associated business feedback responses received by the consumer from the one or more businesses. Information associated with one or more consumer feedback communications is stored, where each of the feedback communications has been previously composed by a consumer, addressed to at least one business and including feedback data relating to the business. A command and consumer feedback communication selection is received from the consumer. Information associated with one of the consumer feedback communications identified by the consumer feedback communication selection is then modified or displayed corresponding to the selected command.

In accordance with yet another aspect of the invention, methods and apparatus of the present invention collect data associated with a consumer through generation of a consumer feedback communication via a wide area network. A business to which the consumer feedback communication is directed is identified in response to input from a consumer via the wide area network. Feedback data relating to the business is obtained from the consumer via the wide area network. At least a portion of the consumer feedback communication is automatically generated using the feedback data. Data associated with the consumer is then collected from the obtained feedback data.

In accordance with yet another aspect of the invention, methods and apparatus for composing and translating a consumer feedback communication directed from a consumer to a business includes identifying a business to which a consumer feedback communication is directed in response to input from a consumer. Feedback data relating to the business is obtained from the consumer. At least a portion of the consumer feedback communication is generated using the obtained feedback data. The consumer feedback communication is addressed to an individual associated with the business. The consumer feedback communication is then translated from a first language to a second language. These and other features of the present invention will be described in more detail below in the detailed description of the invention and in conjunction with the following figures.

BRIEF DESCRIPTION OF THE DRAWINGS

FIG. 2 is an exemplary user interface that may be used by a consumer to initiate the generation of a consumer feedback communication via. the selection of a business and a specific feedback type.

FIG. 3 is an exemplary user interface that may be used by a consumer to generate a letter such as a complaint through the selection of a feedback category and one or more feedback ratings associated with the selected feedback category.

FIG. 4 is an exemplary user interface illustrating exemplary feedback categories related to the hotel industry.

FIG. 5 is an exemplary user interface illustrating exemplary feedback rating selections for the feedback category, food service.

FIG. 7 is an exemplary user interface that may be used by a consumer to generate a question or suggestion consumer feedback communication.

DETAILED DESCRIPTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

The present invention serves as an information based intermediary between consumers and businesses. More particularly, the present invention enables a consumer to provide feedback data, generate consumer feedback communication from this feedback data and send the consumer feedback communication to businesses as well as individuals. During this feedback communication generation and transmission process, consumer data is obtained and interpreted. In response to the consumer feedback communication, a targeted business may send a business feedback response to the consumer. The consumer may then provide updated feedback data, enabling additional consumer data to be obtained and interpreted. The present invention is preferably implemented in a wide area network such as the Internet. More particularly, a consumer may access a web site via the Internet to access the present invention. However, it will become apparent in the following description that many of the process steps need not be performed via the Internet.

A consumer may, for a variety of reasons, wish to provide feedback to a business, entity, or individual by way of the present invention. In accordance with one embodiment, the consumer accesses a web site via the Internet to generate and transmit consumer feedback. More particularly, the web site uses a dynamic consumer feedback communication generator to lead consumers through the process of organizing and elaborating on their feedback. This feedback communication generator prompts the consumer (i.e., user) for information that is useful to businesses to quantify and evaluate the consumer's feedback.

Figure 1:
FIG. 1 is an exemplary user interface that may be used by a consumer to identify an industry within which the consumer wishes to provide feedback.

FIG. 1 is an exemplary user interface that may be used by a consumer to identify an industry within which the consumer wishes to provide feedback. Thus, the consumer selects an industry prior to selecting a business within that industry. As shown, the consumer may identify or select an industry from among a plurality of industries. Exemplary industries include airlines, hotels, car rental businesses, delivery services, electronic commerce sites, personal computers, and Internet Service Providers as well as other industries as indicated by the corresponding hypertext links in FIG. 1. The consumer may then generate a consumer feedback communication addressed to a business within the selected industry. In the following description, the terms "consumer feedback communication" and "letter" will be used interchangeably. However, it will be understood that a letter may take the form of electronic mail or a facsimile as well as conventional postal mail.

Rather than sending a letter, a consumer may wish to view letters sent by other consumers, or responses received by other consumers by entering the Hall of Flames or the Hall of Praise, or by viewing the Response of the Week as indicated by the corresponding hypertext links in FIG. 1. The consumer may therefore visit the Hall of Flames to view letters sent by consumers or portions thereof. As implied by the title, the letters (e.g., complaint letters) either did not result in a response by the businesses or did not yield responses that were favorable to the consumer. Similarly, the consumer may visit the Hall of Praise to view letters such as compliment letters that were sent by other consumers. Of course, the consumer may click on the Response of the Week icon to view responses sent by businesses in response to consumer letters that were received by them.

Figure 2:
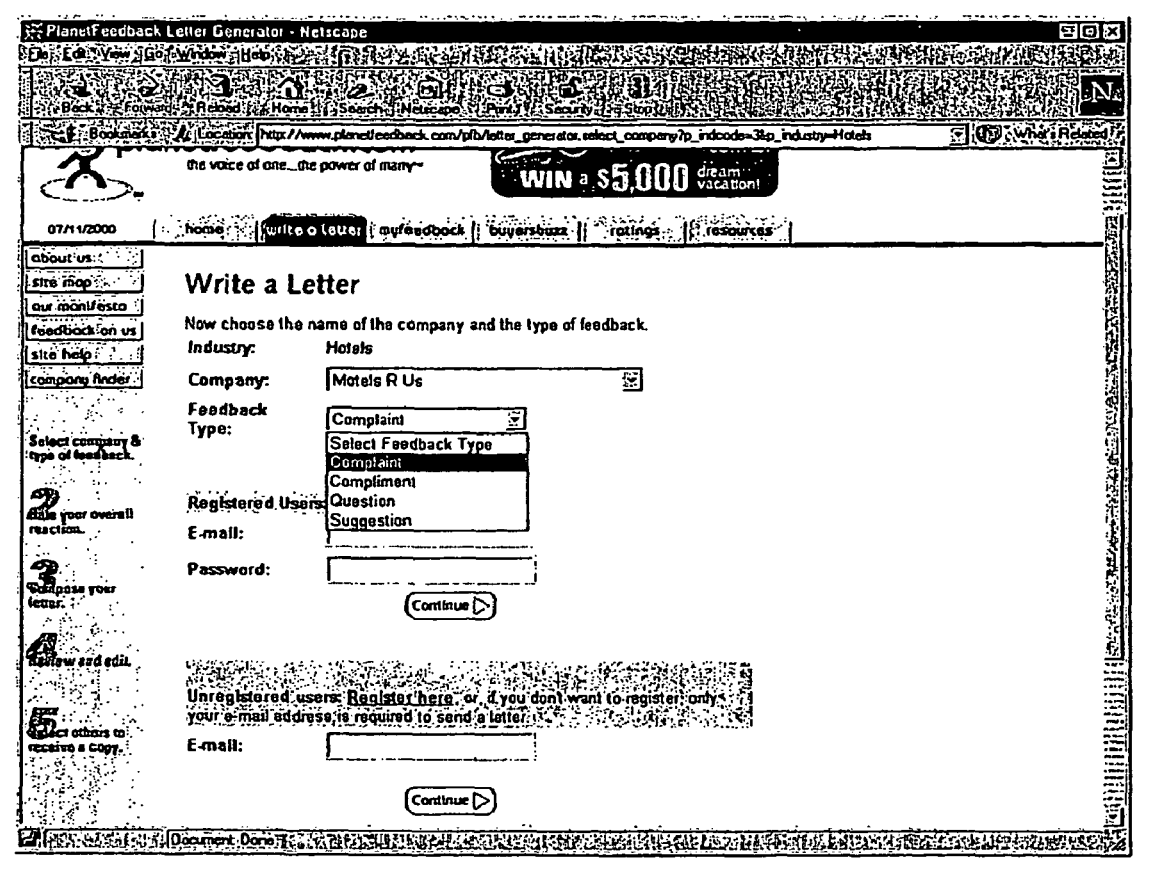

The consumer may wish to provide various types of feedback, which may be positive, negative, or neutral. FIG. 2 is an exemplary user interface that may be used by a consumer to initiate the generation of a consumer feedback communication via the selection of a business and a specific feedback type. In this example, the industry selected by the consumer via the user interface of FIG. 1 is the hotel industry. Within the specified industry, the consumer may then identify a business within this industry. The user may enter a business or may select a business from a plurality of businesses presented to the consumer. Information identifying these businesses, as well as contact information associated with the businesses, may be stored in one or more databases accessible via the web site. As shown, the consumer selects a company within the hotel industry, "Motels R Us". The user may select a feedback type from among a plurality of feedback types to simplify the consumer feedback generation process. As a desired feedback type, the consumer may select from a set of feedback types which reflect the general nature of the feedback. For instance, as shown, an exemplary set of feedback types includes a complaint, compliment, question, and suggestion. In this example, the consumer indicates that the feedback type is a complaint. As will be described below with reference to FIGS. 6A and 6B, a template may be provided for the specified feedback type which will facilitate the feedback process.

Figure 3:
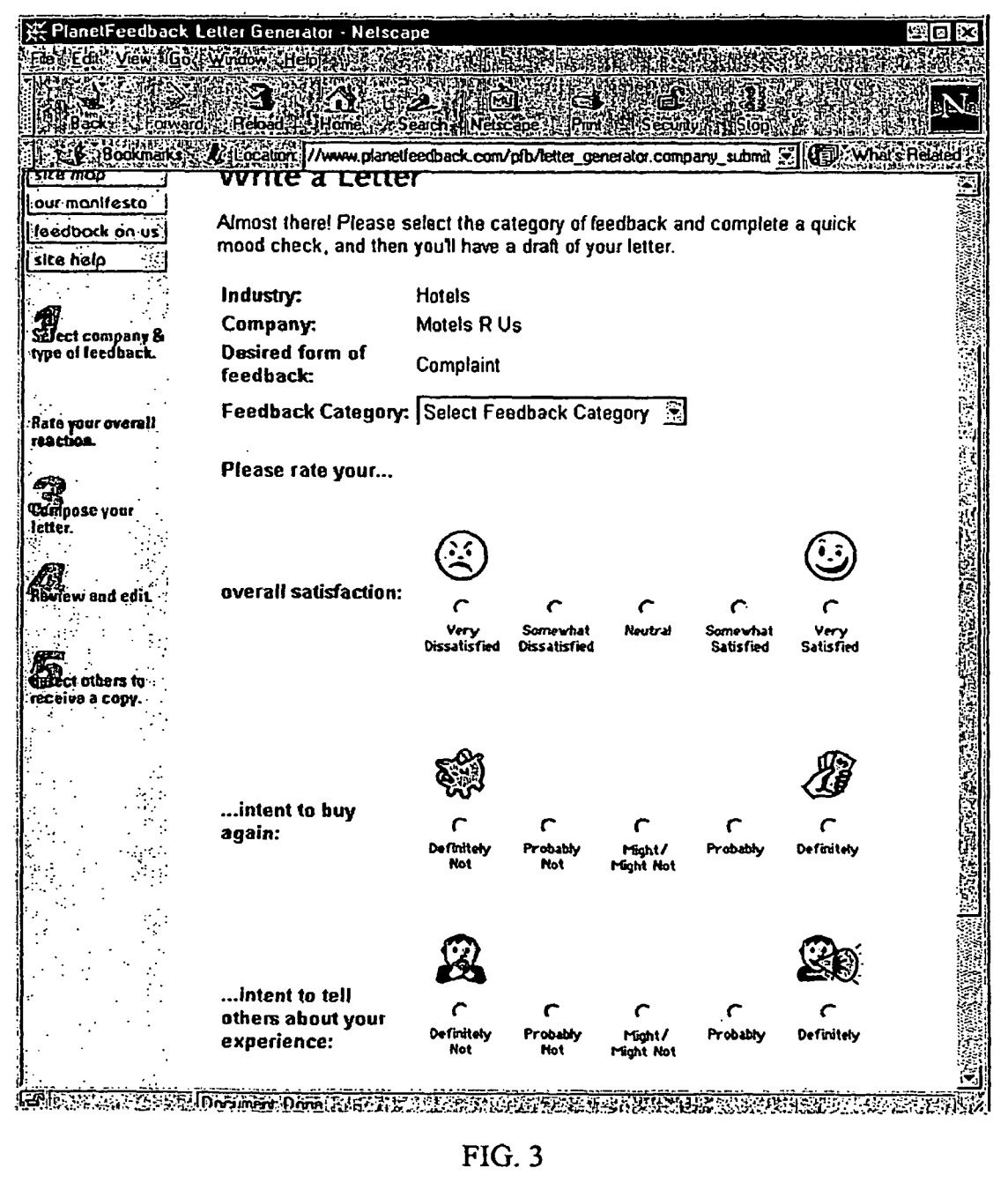

In addition to the type of feedback (e.g., complaint), the consumer provides substantive information to assist the business in rectifying the problem or situation that motivated the consumer to write the complaint. FIG. 3 is an exemplary user interface that may be used by a consumer to generate a letter such as a complaint through the selection of a feedback category and one or more feedback ratings associated with the selected feedback category. As shown, the consumer selects a feedback category from among a plurality of feedback categories relating to the business and/or industry so that the consumer can rate the business according to various criteria within that feedback category. Once the feedback category is selected, the consumer may provide feedback data by selecting one or more feedback ratings to reflect the consumer's opinions of the service or product that he or she received. As shown, a first feedback rating is a satisfaction rating indicating a level of satisfaction of the consumer. The consumer may select one of a set of possible satisfaction ratings including very dissatisfied, somewhat dissatisfied, neutral, somewhat satisfied, and very satisfied. A second feedback rating is a future purchase intent rating indicating a likelihood that the consumer will choose the business for future transactions. The consumer may select one of a set of possible future purchase intent ratings including definitely not, probably not, might/might not, probably, and definitely. A third feedback rating is a future word of mouth intent rating indicating an extent to which the consumer intends to communicate with other consumers regarding the business. The consumer may select one of a set of possible future word of mouth intent ratings including definitely no, probably not, might/might not, probably, and definitely. These feedback ratings may be used separately or in combination. Moreover, these feedback ratings are merely exemplary and therefore other feedback ratings may be used. In addition, the consumer may indicate a category purchase volume (not shown) as well as category purchase frequency (not shown) for a particular product or service. Moreover, the consumer may indicate brand purchase loyalty information (not shown) indicating a level of loyalty of the consumer to a particular brand or business.

Figure 4:
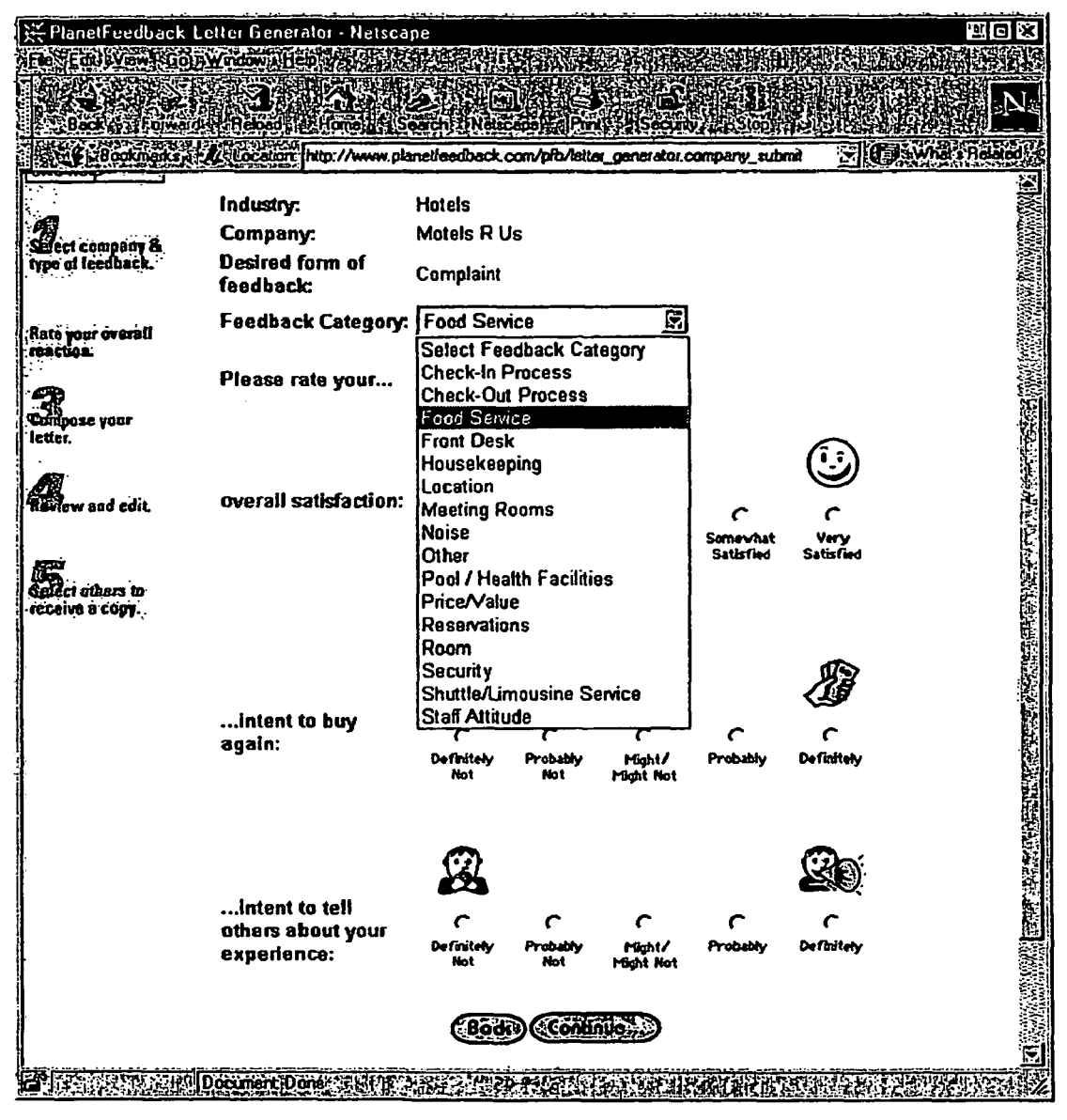

The consumer may wish to provide different feedback depending upon the industry and business involved. FIG. 4 is an exemplary user interface illustrating exemplary feedback categories related to the hotel industry. Within the hotel industry, a variety of feedback categories may be selected. As shown, the consumer selects the feedback category, food service, from among a plurality of feedback categories presented to the consumer. Alternatively, the consumer may want to provide feedback in relation to the check-in process, the check-out process, the front desk service, housekeeping, location, meeting rooms, noise, pool/health facilities, price/value, reservations, room, security, shuttle/limousine service, and staff attitude. Further exemplary feedback categories include reservations, room, food service, and shuttle/ground transportation. Accordingly, a different set of feedback categories may be presented depending upon the industry relevant to the selected business.

Figure 5:
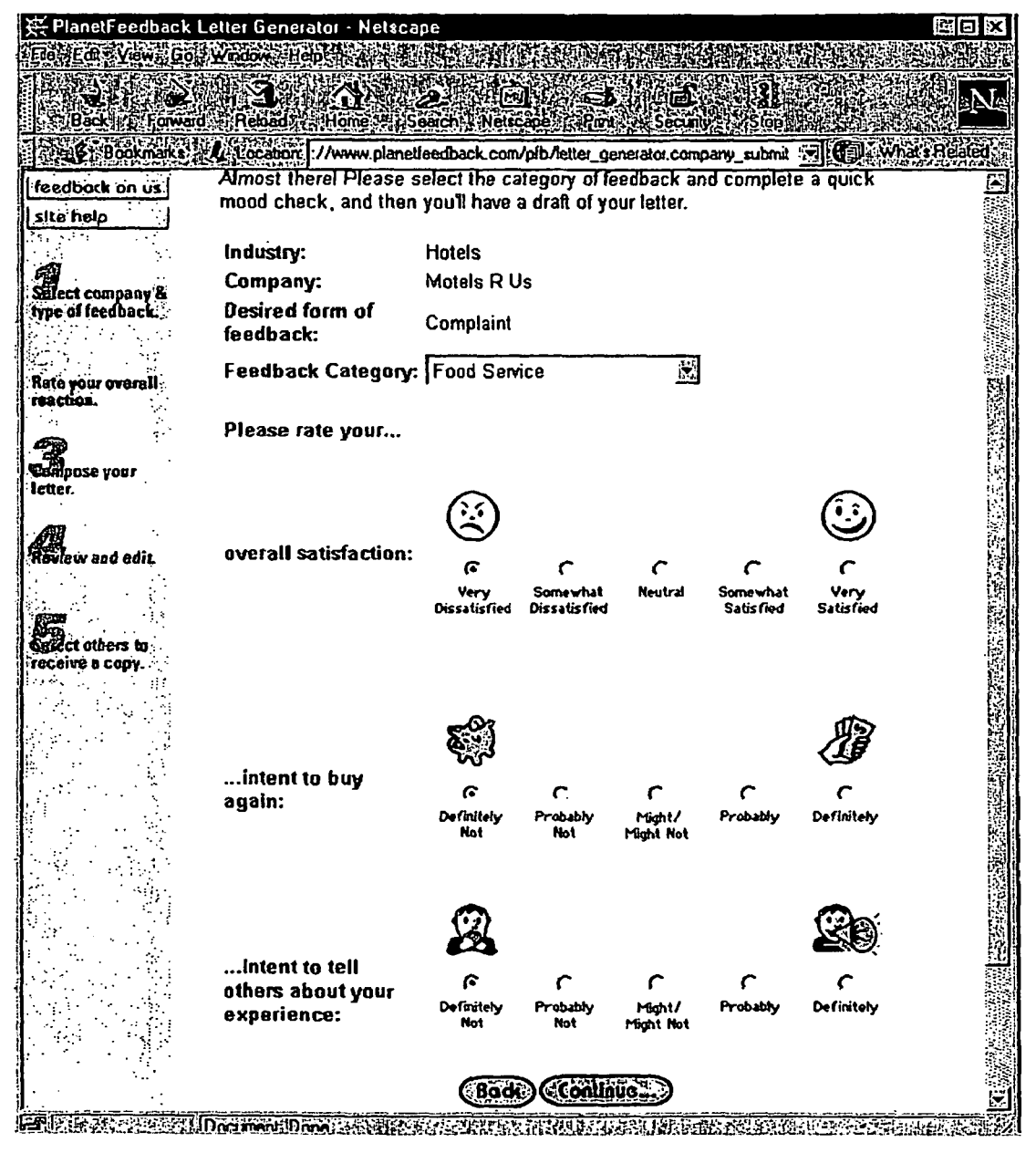

Since the feedback ratings will ultimately be used to generate data that may be used and analyzed by a business, a predetermined set of feedback ratings is presented to the consumer. FIG. 5 is an exemplary user interface illustrating exemplary feedback rating selections for the feedback category, food service. In this example, the satisfaction rating selected by the consumer is "very dissatisfied," the future purchase intent rating selected by the consumer is "definitely not," and the future word of mouth intent rating 308 selected by the consumer is "definitely not."

Figure 6A:
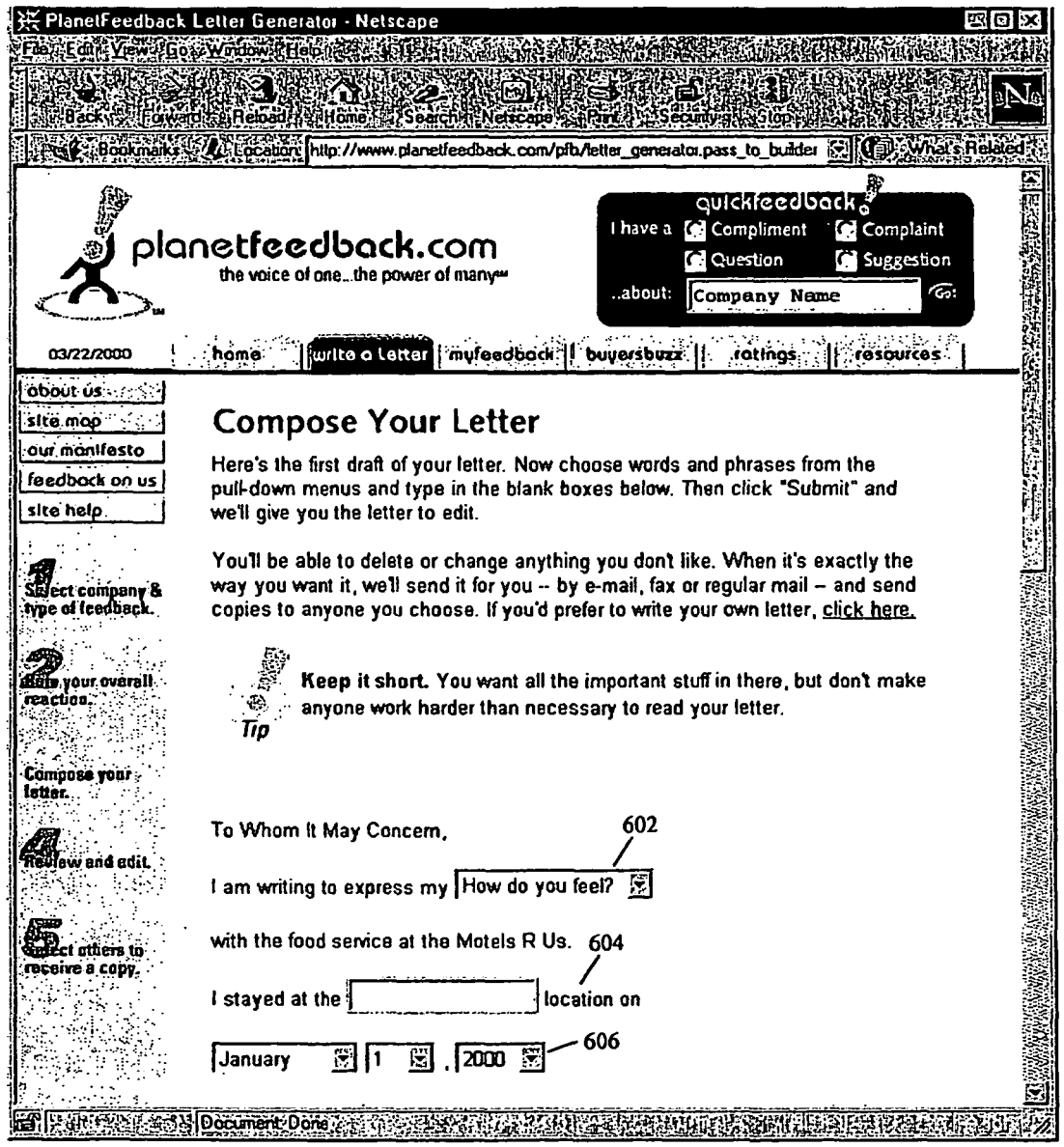
FIG. 6A is an exemplary template that may be used by a consumer to generate a first portion of a complaint or compliment consumer feedback communication.

A consumer feedback communication is automatically generated from the feedback data provided by the consumer. In addition, the feedback process is simplified through the use of a template. FIG. 6A is an exemplary template that may be presented to a consumer to generate a first portion of a complaint or compliment consumer feedback communication. The consumer may select words and phrases from pull-down menus which correspond to the feedback type previously selected. For instance, for a complaint letter, the potential feelings 602 that may be selected by a consumer may be strictly negative. Thus, the template that is generated may correspond to a feedback type previously indicated by a consumer. In addition, the template may also correspond to the industry selected by the consumer. For instance, for the complaint letter generated for the hotel industry, the consumer has the opportunity to generate free form text to indicate the location 604 of the Motels R Us where the consumer a receive the undesirable food service, as well as indicate the relevant date 606 (e.g., Jan. 1, 2000).

Figure 6B:
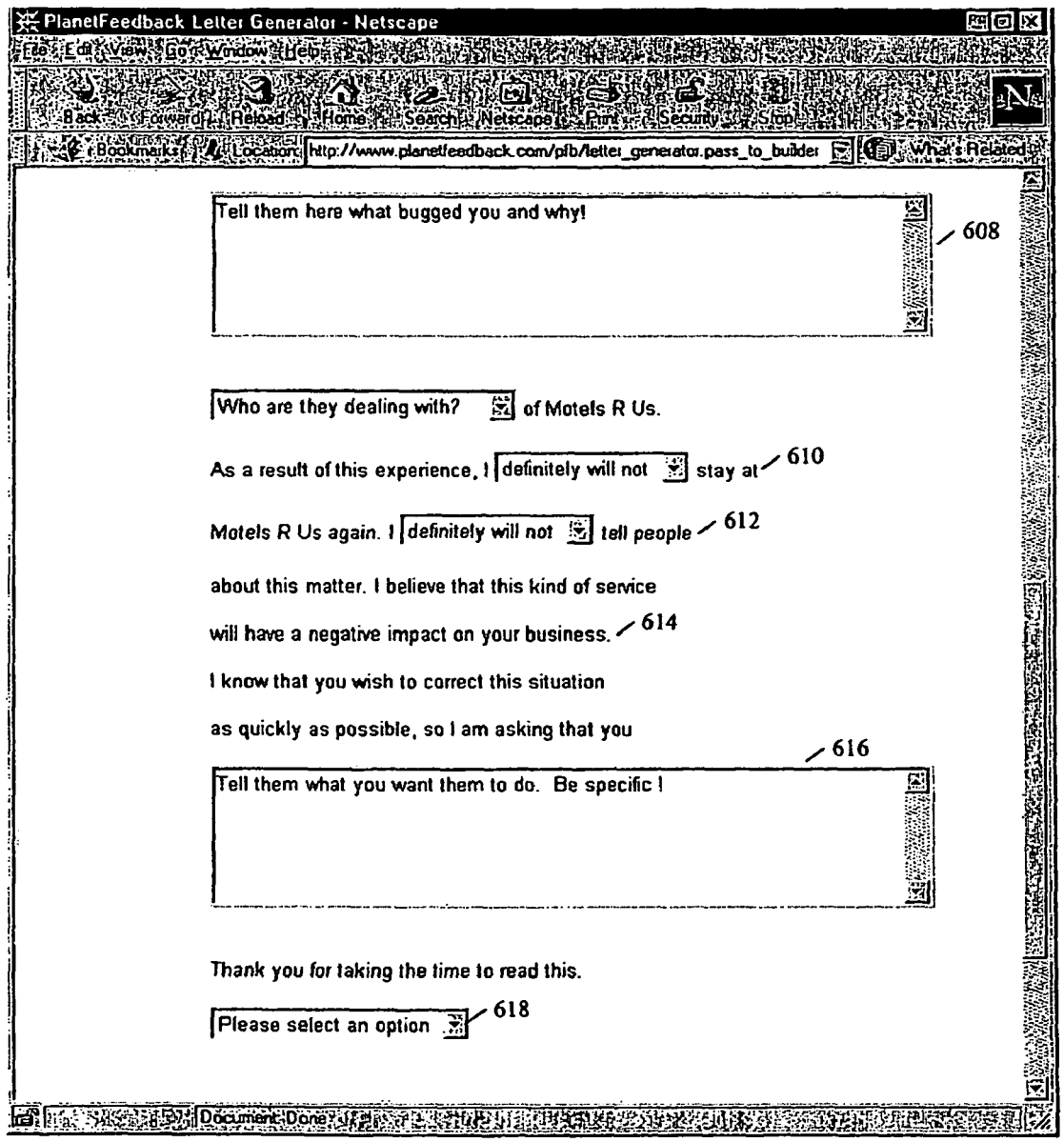
FIG. 6B is an exemplary template that may be used by a consumer to generate a second portion of a complaint or compliment consumer feedback communication.

The template may be designed to further enable the consumer to input additional free form text as well as enter other data deemed appropriate for the particular industry or company. FIG. 6B is an exemplary template that may be used by a consumer to generate a second portion of a complaint or compliment consumer feedback communication. A scrolling window 608 enables the consumer to describe the situation in further detail. Moreover, the template preferably incorporates the feedback data (e.g., ratings) previously obtained from the consumer and drives the context of the resulting letter created from the template. For instance, the satisfaction rating and future purchase intent rating previously indicated by the consumer are reflected in the template as shown at pull-down menu 610. In addition, another pull-down menu 612 presents selections to the consumer that reflect the future word of mouth intent rating previously obtained from the consumer. Thus, although the selections reflect the feedback data, the previously entered feedback data may be modified by the consumer. Additional text 614 provided in the template may further reflect that the feedback type selected by the consumer is a complaint. The consumer has the option of entering free form text 616 to request a particular action by the business to resolve the situation that prompted the complaint. Finally, the consumer can select a closing line 618 such as sincerely, very truly yours, or cordially.

The templates shown and described above with reference to FIGS. 6A and 6B are used to generate a complaint letter. These templates may similarly be used to generate a compliment letter. In this manner, a consumer may quickly generate a personalized letter to a business identified by the consumer.

Figure 7:
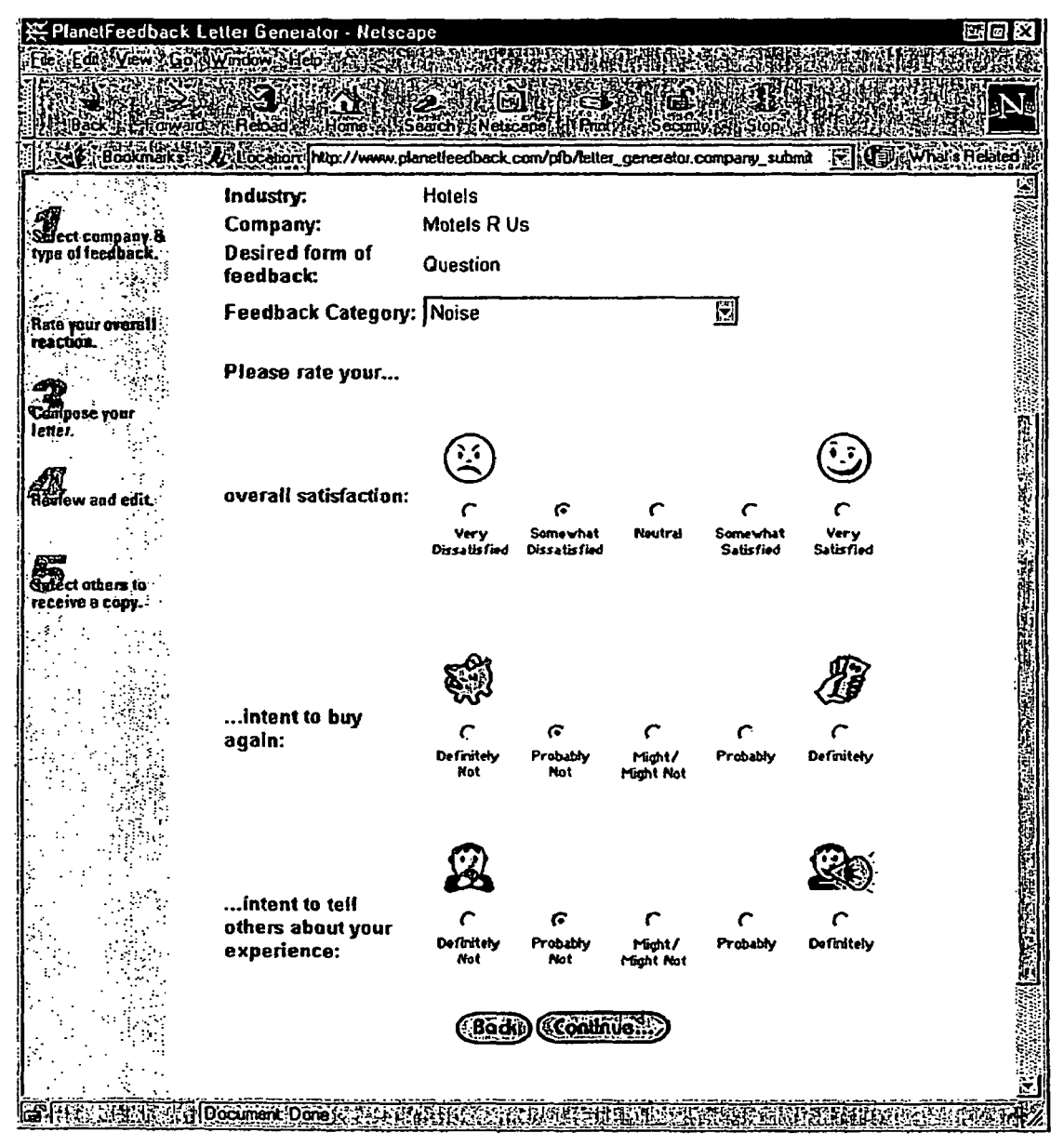

While the consumer may want to write a complaint or compliment, the consumer may also merely have a suggestion or a question. FIG. 7 is an exemplary user interface that may be used by a consumer to generate a question or suggestion consumer feedback communication. As shown, the desired form of feedback is a question while the feedback category that is selected by the consumer is noise. The user may then provide feedback data (e.g., feedback ratings) as described above.

Figure 8:
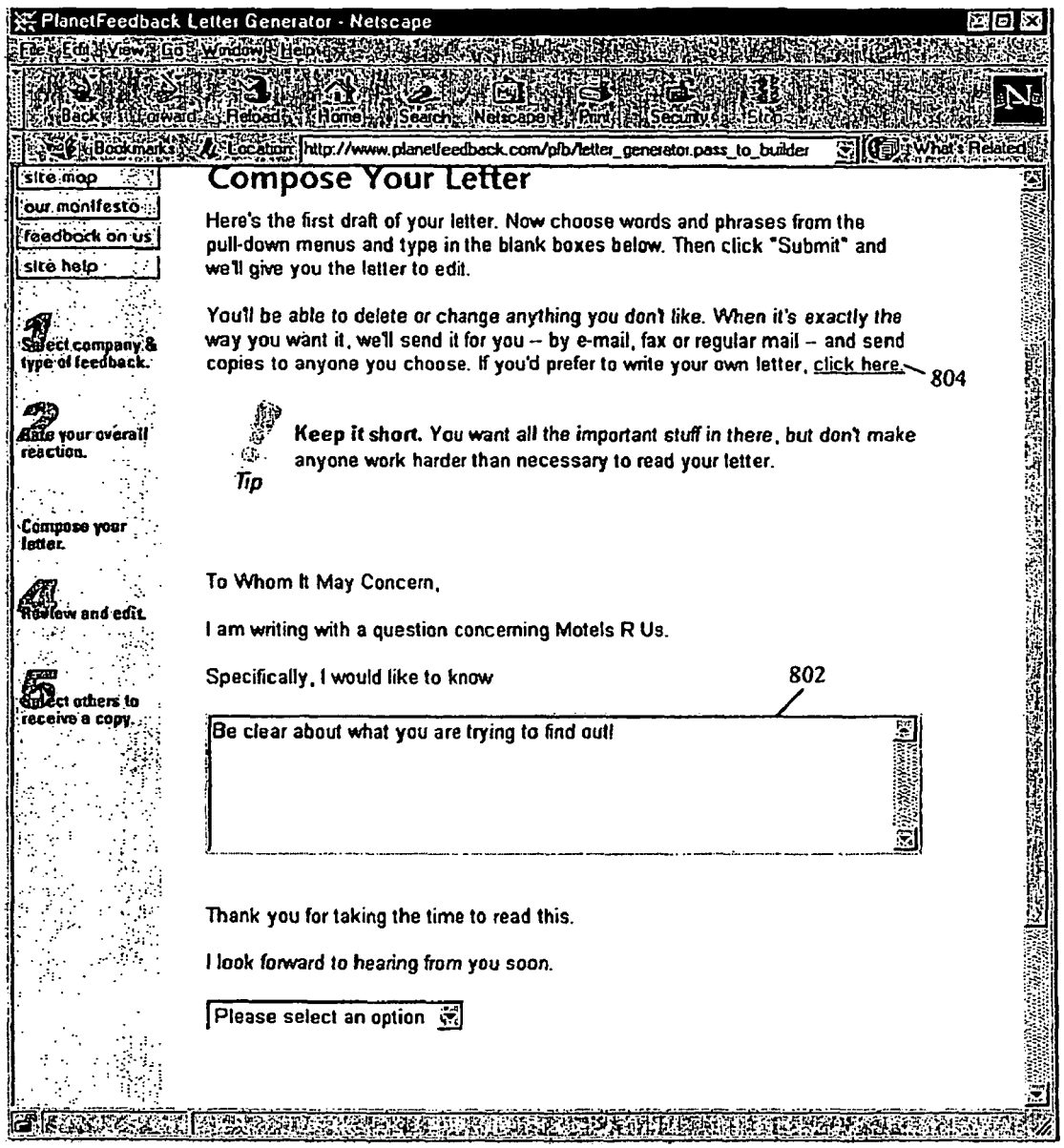
FIG. 8 is an exemplary template that may e use by a consumer to generate a question or suggestion consumer feedback communication.

It may be desirable to provide different templates for different feedback types. For instance, it may be desirable to supply different information and therefore a different template for a question or a suggestion than that presented for a complaint or a compliment. FIG. 8 is an exemplary template that may be used by a consumer to generate a question or suggestion consumer feedback communication. In this template, the consumer may simply generate free form text 802 to ask a question or, alternatively, supply a suggestion. Accordingly, multiple templates may be associated with various feedback types and feedback categories in order to facilitate the generation of a consumer feedback communication. Of course, a consumer may also wish to generate his or her own free form letter as shown at 804.

As described above with reference to FIG. 1 through FIG. 8, the consumer feedback communication generation tool combines free form text with structured measurements via icons, radio buttons, drop down boxes and other instrumentation to generate and send a text based letter to a business or marketer. In this manner, a consumer may write a letter to a business in very little time and with very little effort, thereby promoting the feedback process. Moreover, as will be described in further detail below, attitudinal and behavioral consumer data is collected without an obvious and tedious survey process.

The present invention also enables a consumer to send a letter to a business, even where the preferred language of the target business differs from that of the consumer. Thus, a letter may be translated by a consumer prior to being sent. Alternatively, a letter may be translated automatically (e.g., based upon geographic region associated with the consumer and/or the geographic region associated with the business). While the free form text may be translated, a basis for translating the feedback ratings as well as the structured measurements obtained throughout the feedback process may also be established. Moreover, in order to promote the response and resolution process, a business feedback response may also be translated upon initiation by the business or automatically upon generation and transmission of the response. It is important to note that the structured measurements may be translated in advance to yield comparable data across different languages and cultures. Accordingly, the present invention promotes communication between consumers and businesses, as well as serves to bridge the cultural and linguistic gap between consumers and businesses.

During the letter generation process, consumers have the opportunity to target as well as carbon copy select relevant stakeholders on their correspondence. These individuals may be selected based upon a variety of factors such as industry or product category, business, and/or geographic region (e.g., zip code). For instance, the geographic region associated with the business as well as the consumer may be used to target various individuals who might be motivated to react to the feedback sent by the consumer.

In addition to the identification by the consumer of individuals to receive the correspondence, the present invention may address the letter to various individuals an stakeholders automatically without intervention or initiation by the consumer, allowing the consumer to modify the inclusion of these individuals and stakeholders as recipients of the message. For instance, when a consumer addresses a complaint to the airline industry, the letter may be automatically addressed and sent to the U.S. Department of Transportation. For instance, the present invention may list the U.S. Department of Transportation as a stakeholder who may receive a carbon copy upon selection by the consumer. This addressing capability may be accomplished through a set of influence databases that are accessible to the consumer feedback communication generator. As one example, these databases may identify governmental officials such as federal, state, and local politicians according to geographic region. As another example, these databases may identify federal or state politicians according to relevant subcommittee. As yet another example, special interest groups and associations may be indexed according to geographic region as well as industry. In addition, the consumer may extend their influence by transmitting the communication to the consumer's "circle of influence." By entering the names and electronic mail addresses, facsimile numbers and/or postal mail addresses, the consumer may influence the purchase decisions of relatives, colleagues, and neighbors. Since each of these people may also forward the letter to others, the viral diffusion can potentially extend to numerous people. One method of calculating the extent to which a consumer can influence others will be described in further detail below with reference to FIG. 19.

Once the letter is addressed automatically or by the consumer, contact information is associated with the letter to enable the letter to be directed to the appropriate individuals and stakeholders. For instance, the contact information may include an electronic mail address, a postal address, and a facsimile number. In addition, information such as name, function, title, telephone number, and other pertinent information may be stored. The letter is then sent via this contact information. Thus, letters need not be delivered via electronic mail in all cases. For instance, a business may prefer that a letter be delivered via conventional mail or facsimile rather than via electronic mail.

In addition to the mode of delivery, a business may prefer that data be supplied in a simplified format in addition to, or instead of, the textual format. For instance, a business may request feedback data (e.g., feedback ratings, purchase volume, and purchase frequency) that are supplied by the consumer as well as consumer data that are generated as a result of the letter generation process. Thus, a business need not dedicate internal resources to parsing the text of a letter to create a digital record of the nature and severity of an incident, or to profile the consumer according to data provided in the letter. The consumer data may include, for instance, indices indicating a level of brand purchase loyalty of the consumer, economic value of the consumer, and the potential word of mouth influence of the consumer. Exemplary methods for calculating these indices will be described in further detail below with reference to FIGS. 17-19. In addition, other data used to calculate one or more of the indices may be supplied. For instance, the number of people to whom a letter is addressed or copied and the number of letters generated (e.g., within a particular industry or feedback category) may be recorded for transmission to a business or marketer. This data may be delivered as regularly scheduled database downloads or from within a data delivery mechanism that allows for immediate and real-time access to the data. In addition, reporting tools may be provided to allow access and interaction with the data via on-line analytical processing tools.

Figure 9:
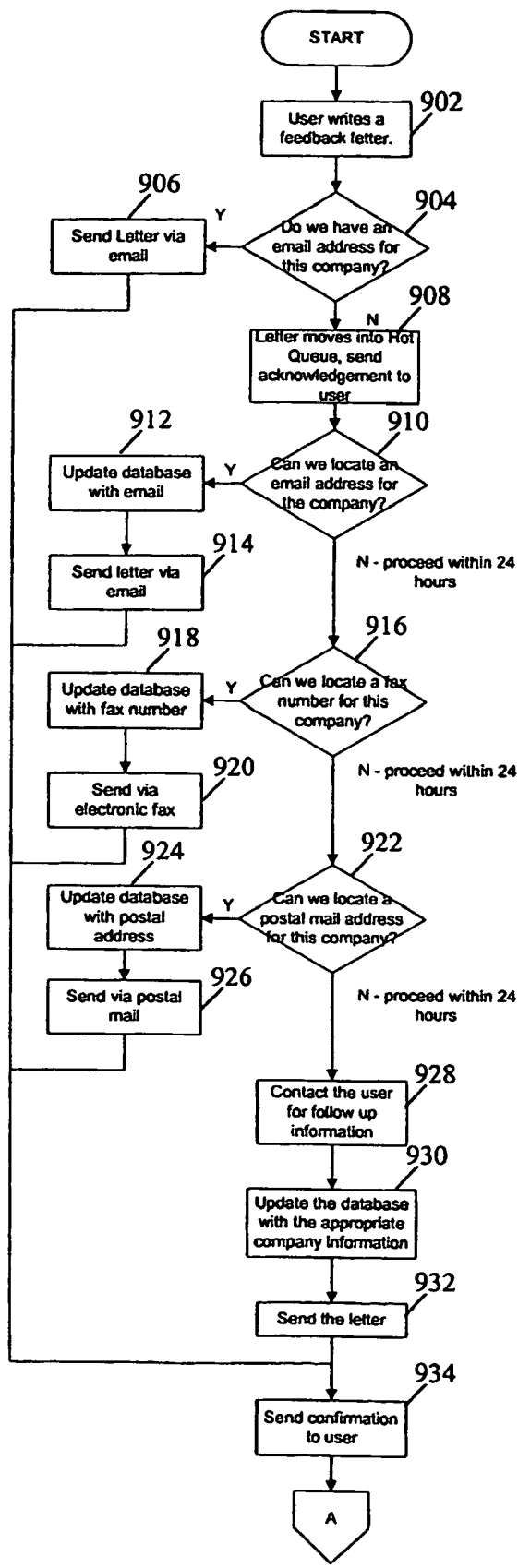
FIG. 9 is a process flow diagram illustrating a method of delivering a consumer feedback communication in accordance with an embodiment of the invention.

When a letter (i.e., consumer feedback communication) is generated, the letter is ultimately delivered via an available mode of delivery. Although as described above a business may have a preferable mode of letter delivery, the following process flow diagram is shown to handle all modes of delivery for illustrative purposes. FIG. 9 is a process flow diagram illustrating a method of delivering a consumer feedback communication in accordance with an embodiment of the invention. When a consumer generates a feedback communication at block 902, the communication may be sent by electronic mail, facsimile, or conventional postal mail. Thus, it is determined at block 904 whether the contact information includes an electronic mail address for the business (e.g., contact person associated with the business). If the available contact information includes an electronic mail address, the letter is sent via electronic mail at block 906 and an acknowledgement letter is sent to the originator. Otherwise, the process continues at block 908 at which time the letter is moved into a "hot queue" that stores letters that are to be transmitted (pending the retrieval of missing data) or, alternatively, information identifying these unsent letters. In addition, an acknowledgement may be sent to the consumer. For instance, the acknowledgement may indicate that the letter will be sent once contact information associated with the business is located. Next, it is determined at block 910 whether an electronic mail address can be located for the business. This may be accomplished, for instance, via the Internet, telephone, or other suitable information resource. In addition, this process may be automated as well as performed by a set of information specialists. When an electronic mail address is located, the contact information associated with the business is stored in a database at block 912. More particularly, this contact information may be stored in or associated with an address book corresponding to the consumer sending the letter. The letter is then sent by the newly obtained electronic mail address at block 914. If an electronic mail address cannot be located within a specified period of time (e.g., 24 hours), at block 916 it is determined whether a facsimile number can be located for the business. As described above with reference to a newly located electronic mail address, when a facsimile number is located, a database is updated at block 918. The letter is then sent via the facsimile number at block 920. Similarly, if the facsimile number for the business or individual cannot be located within a specified period of time, an attempt is made to locate a conventional postal mail address for the business at block 922. When the address is located, the appropriate database(s) are then updated with this newly acquired mailing address at block 924. The letter is addressed to the appropriate individual (e.g., CEO or customer service representative) and sent via conventional postal mail at block 926. If no contact information can be located within a specified period of time (e.g., 24 hours), the consumer is contacted for follow-up information as shown at block 928. For instance, the follow-up information may include contact information or may merely provide information which may enable contact information to be located. The database and therefore the consumer's private address book is updated at block 930, the letter is sent using the contact information (e.g., supplied by the consumer) at block 932, and a confirmation is sent to the consumer at block 934. When the letter is successfully sent, the consumer's private address book is also updated to include contact information for all other individuals to whom the letter was transmitted.

In addition to ensuring that a letter is delivered to the desired business, the present invention updates the system databases with business feedback response information as well as updated consumer feedback data obtained in reaction to this response. Moreover, the present invention attempts to promote resolution and response from a business by enabling a letter and/or response to be published (e.g., via the Internet).

Figure 10:
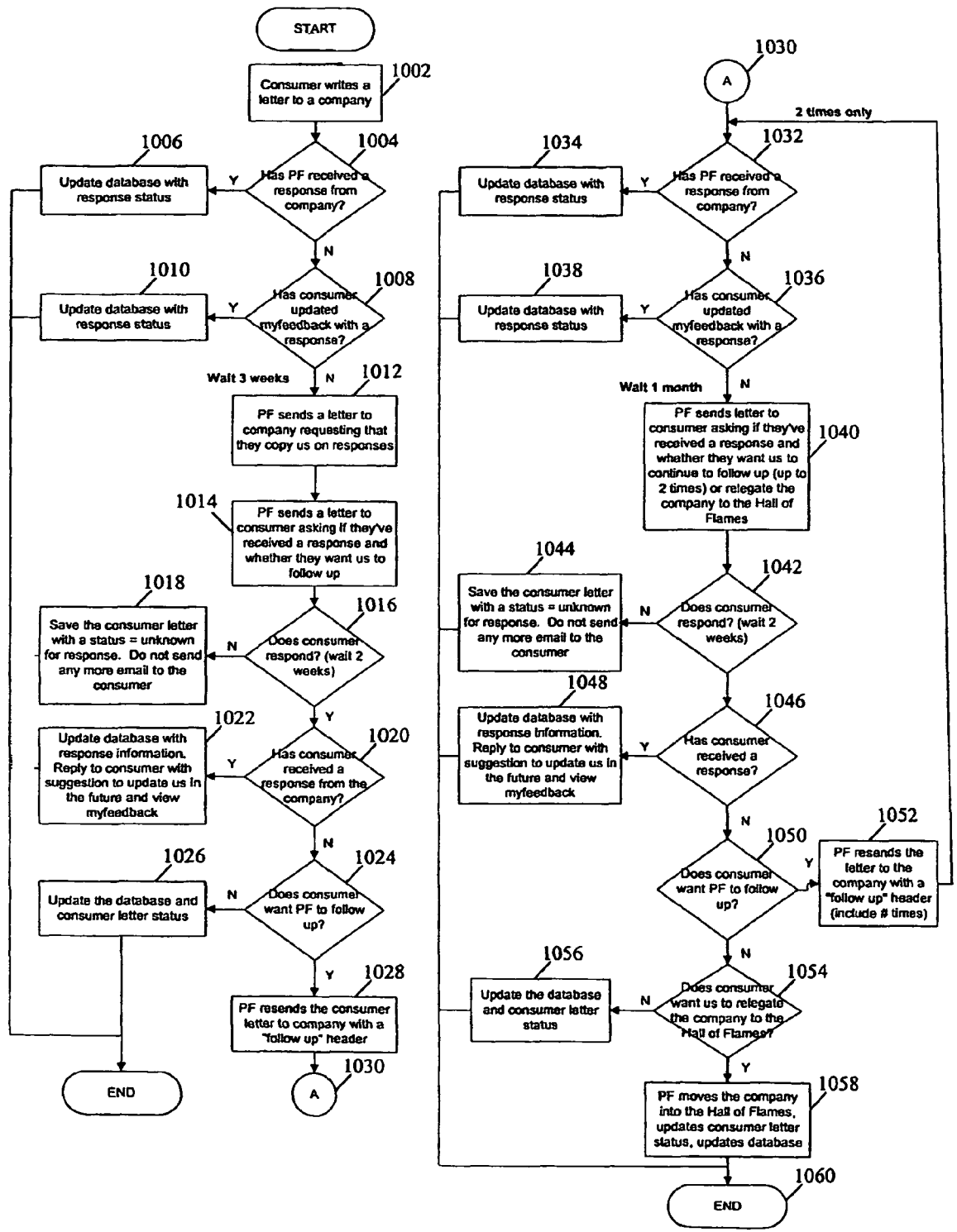
FIG. 10 is a process flow diagram illustrating a method of performing follow-up and resolution during the consumer feedback communication and response process in accordance with an embodiment of the invention.

FIG. 10 is a process flow diagram illustrating a method of performing follow-up and resolution during the consumer feedback communication and response process in accordance with an embodiment of the invention. The consumer generates a letter to a business at block 1002. At block 1004 the web site provider determines whether a response has been received from the business via the web site. When a response is received, a system database is updated with a response status (i.e., response indicator) indicating that a response has been received at block 100. Alternatively, when it is determined that a consumer has updated the system with a response (e.g., received separately from the present invention) at block 1008, a system database is updated with a suitable response status at block 1010. For example, the response status may indicate that delivery of the consumer feedback communication is in process, outcome is pending, email has been sent, fax has been sent, postal mail has been sent, delivery of the feedback communication is confirmed, the business has responded, the consumer feedback communication has been resent to the business, the situation that prompted the communication has been satisfactorily resolved, the business has been relegated to the "Hall of Shame" (the situation that prompted the consumer feedback communication has not been satisfactorily resolved or the business has not responded to the consumer feedback communication), and the feedback communication has been deleted.

When a business response is not received by the consumer or the web site provider, after a specified period of time (e.g., 3 weeks), the web site provider sends a letter to the business requesting that they copy the web site service on all responses at block 1012. This letter may be sent via electronic mail, facsimile, or postal mail. In addition, at block 1014 the web site provider sends a letter (e.g., via electronic mail, facsimile, or postal mail) to the consumer asking if they have received a response and whether they would like the web site provider to follow up with the business. At block 1016, if the consumer does not respond within a predetermined period of time (e.g., 2 weeks), a response status is associated with the letter at block 1018. More particularly, the response status is stored in a database to indicate that the response status is unknown. At this time, the web site provider sends no further mail to the consumer. When a consumer indicates at block 1020 that a response has been received from the business, the system databases are updated with response information at block 1022. More particularly, this response information may include at least a portion of the response as well as a response status. In addition, the web site provider replies to the consumer with a suggestion to provide updated feedback data in the future. In other words, the consumer may provide updated feedback ratings, possibly indicating an increase in loyalty as a result of resolution of the event that initiated the feedback. At block 1024 if the consumer indicates that he or she has still not received a response from the business and does not want the web site provider to follow up, the consumer letter status associated with the consumer letter is updated to indicate that follow up is not requested at block 1026. Alternatively, the web site provider resends the consumer feedback letter to the business with a "follow up" header at block 1028. The process continues at block 1030.

The above-described process is repeated as follows to ensure that the system databases are current and that the feedback event is resolved in accordance with the consumer's preferences. At block 1032 the web site provider determines whether a response has been received from the business via the web site. When a response is received, a system database is updated with a response status indicating that a response has been received at block 1034. Alternatively, when it is determined that a consumer has updated the system with a response at block 1036, a system database is updated with a suitable response status at block 1038.

When a business response is not received by the consumer or the web site provider, after a specified period of time (e.g., one month), the web site provider sends a letter to the consumer at block 1040 asking if they have received a response and whether they would like the web site provider to follow up with the business or to relegate the business to the Hall of Shame. In other words, the consumer may request that at least a portion of the consumer letter be published on the Internet. At block 1042, if the consumer does not respond within a predetermined period of time (e.g., 2 weeks), a response status is associated with the letter at block 1044. More particularly, the response status is stored in a database to indicate that the response status is unknown. At this time, the web site provider sends no further mail to the consumer. When a consumer indicates at block 1046 that a response has been received from the business, the system databases are updated with response information at block 1048. More particularly, this response information may include at least a portion of the response as well as a response status. In addition, as described above, the web site provider replies to the consumer with a suggestion to provide updated feedback data in the future. In other words, the consumer may provide updated feedback ratings. At block 1050 if the consumer indicates that he or she has still not received a response from the business and wants the web site provider to follow up, the web site provider resends the consumer feedback letter to the business with a "follow up" header at block 1052. Alternatively, when a consumer has not received a response to his or her consumer feedback communication, the consumer may wish to relegate the business to the Hall of Flames as shown at block 1054 rather than attempting to further contact the business. Otherwise, the consumer letter status is updated at block 1056 to indicate that neither follow up nor publication is requested. When the consumer requests publication of the letter, the web site provider publishes at least a portion of the letter in the Hall of Flames and updates the consumer letter status to reflect this publication at block 1058. Process blocks 1032 through 1052 may be repeated two times prior to ending the follow up and resolution process at block 1060. Accordingly, the present invention (e.g. via a web site) supplies response services that promote the transmission of a response by a business to a consumer initiated feedback communication.

Figure 11:
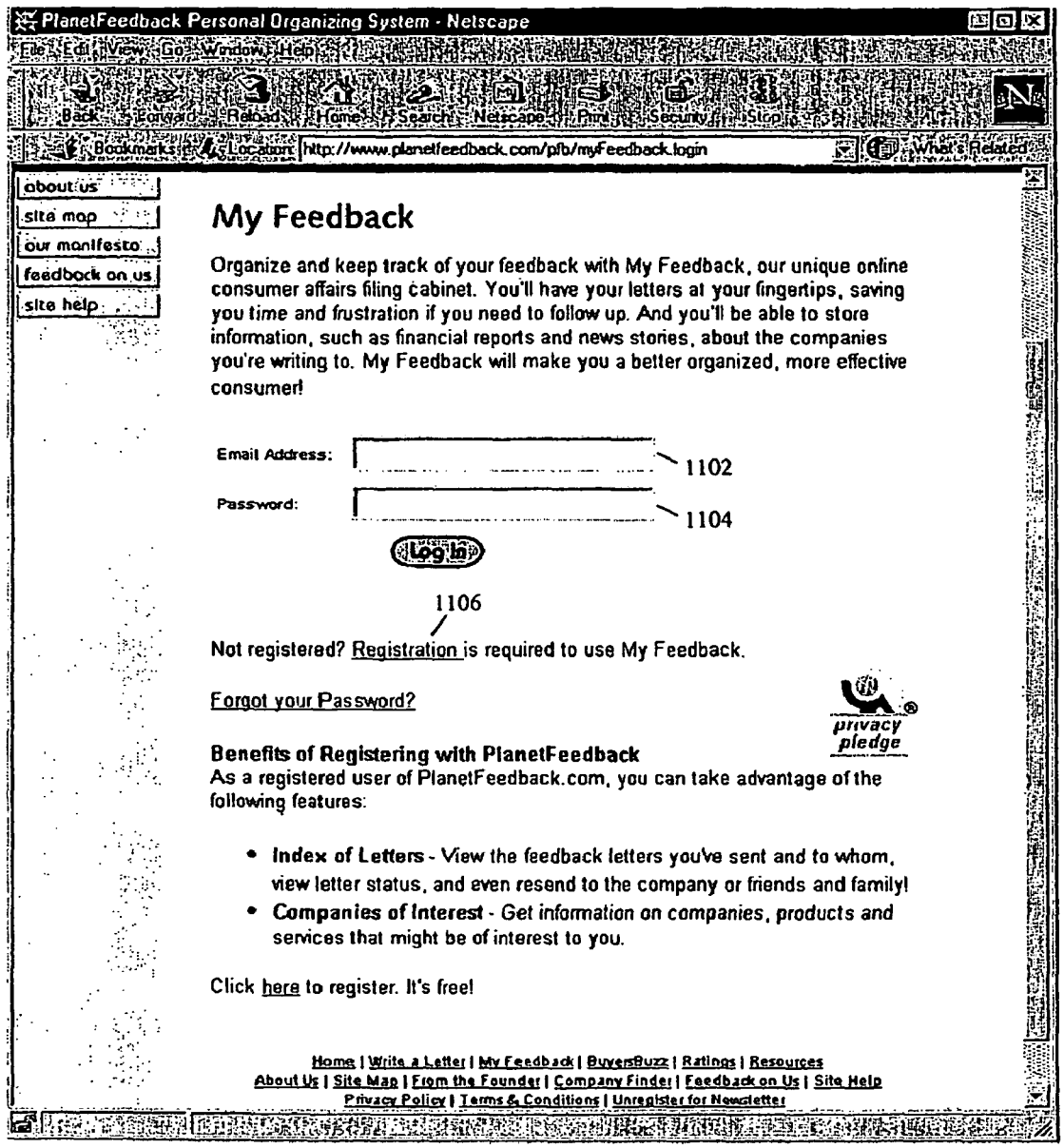
FIG. 11 is an exemplary user interface that may be used by a consumer to access the consumer's feedback communication and associated response data.

In accordance with one embodiment of the invention, the consumer may access an online consumer affairs filing cabinet to organize and keep track of the consumer letters generated and associated feedback. FIG. 11 is an exemplary user interface that may be used by a consumer to access the consumer's feedback communication and associated response data. Since the consumer may access only his or her private letters and feedback, the consumer enters an email address 102 and a password 1104 to access this information. In order to create a private filing cabinet, the consumer may initiate registration as shown at 1106. Once the consumer has registered, the consumer may view the consumer feedback communication sent by the consumer as well as associated information such as letter status. It is also important to note that the consumer may also: resend or forward the letter (e.g., to friends or family).

Figure 12:
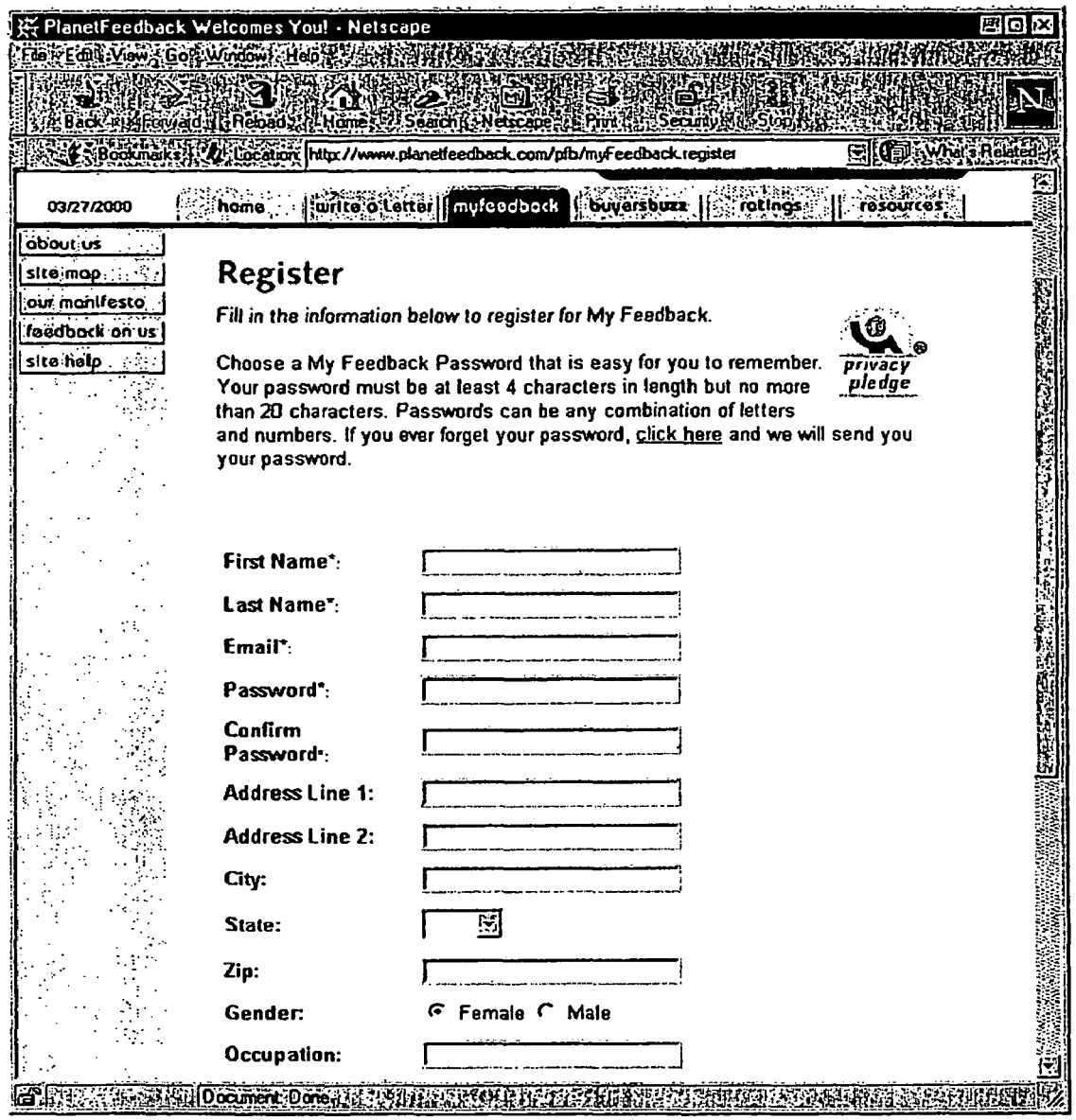
FIG. 12 is an exemplary user interface that may be used by a consumer to register with the feedback and response system.

FIG. 12 is an exemplary user interface that may be used by a consumer to register with the feedback and response system. During the registration process, the web site provider may obtain various consumer data such as socio-economic data and address information identifying a geographic region (e.g., zip code) within which the consumer lives or works. As shown, the consumer may enter a first name, last name, an electronic mail address, a password, and address information including; a specific address and/or city, state and zip code. In addition, socio-economic data including gender, occupation, salary (not shown), and education level (not shown) may be obtained.

Figure 13:
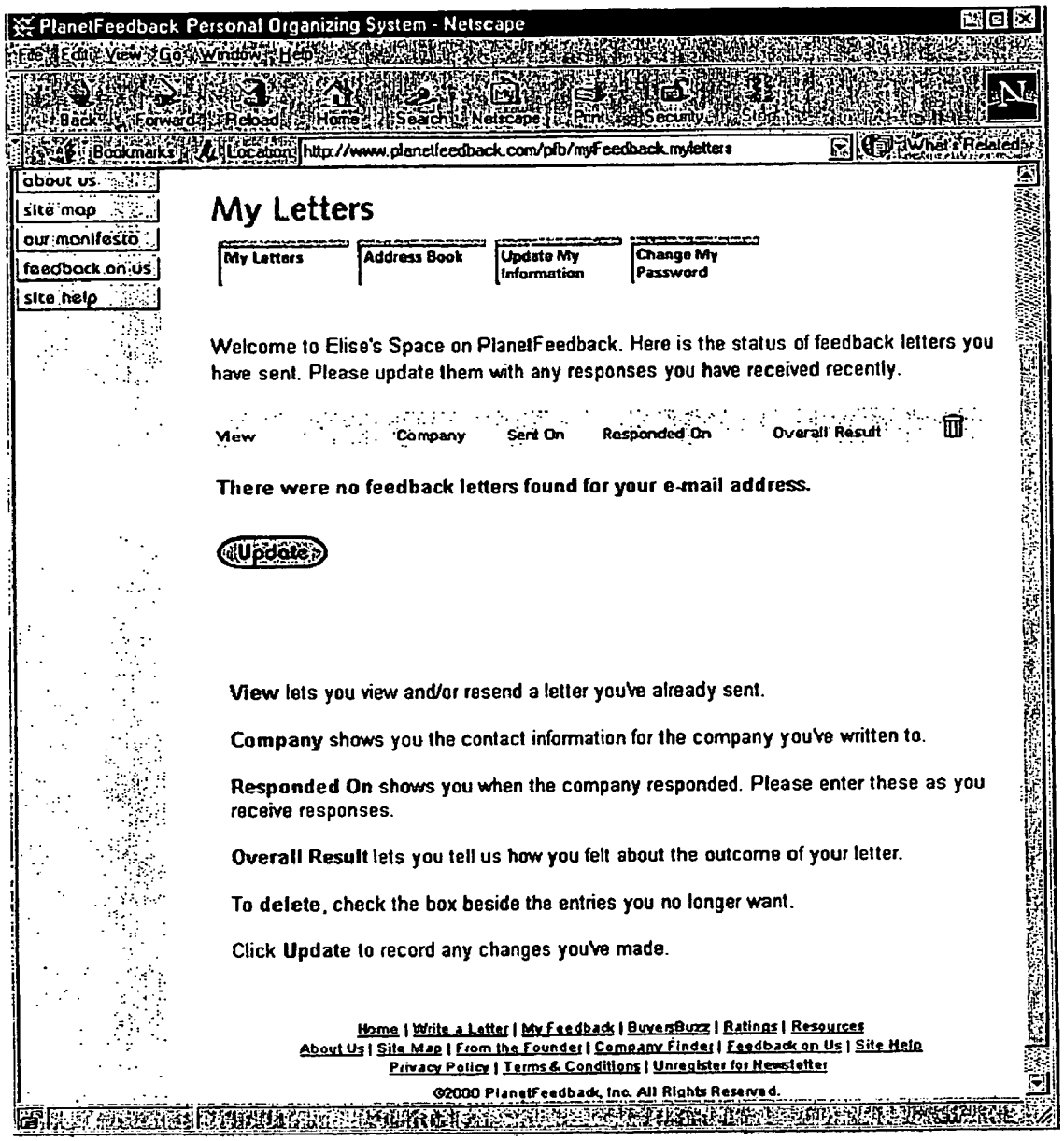
FIG. 13 is an exemplary user interface that may be used by a consumer to view consumer feedback communications sent by the consumer, update business feedback response data associated with those communications, and provide updated feedback data in response to a business feedback response.

As described above, the consumer may access his or her own private filing cabinet. FIG. 13 is an exemplary user interface that may be used by a consumer to view consumer feedback communications sent by the consumer, update business feedback response data associated with those communications, and provide updated feedback data in response to a business feedback response as indicated by the corresponding hypertext links in FIG. 13. More particularly, a consumer may wish to VIEW and/or resend a letter that was previously sent. Thus, the consumer may retrieve as well as reference his or her feedback communication and associated responses. Moreover, the consumer may resubmit a letter to a business or marketer or, alternatively, redirect or forward a letter to friends, family or other individuals. In addition, contact information for the business or COMPANY that the letter was delivered to may be viewed. The consumer may wish to view the date that the letter was SENT ON as well as the date that the company RESPONDED ON. When a consumer receives a business feedback response, the consumer may enter various information such as text as well as the date the response was received. The consumer may also DELETE information associated with a particular letter sent by the consumer. In order to update and record changes that the consumer has made to his or her filing cabinet, the consumer may click on UPDATE. Thus, the consumer may add, modify, delete, or view information related to the previously sent letters and associated responses. Finally, a consumer may provide updated feedback data in reaction to a response of a business by clicking on OVERALL RESULT. Thus, through the receipt of a command from a consumer that selects a particular hypertext link or otherwise indicates information to be displayed or modified, information associated with various feedback communications may be displayed or modified as indicated. As described above, the feedback data may include updated feedback ratings as well as free form text submitted by the consumer. In this manner, a consumer may indicate whether the situation was resolved. Moreover, a business receiving this feedback data may ascertain whether its attempt at resolution was successful.

Figure 14:
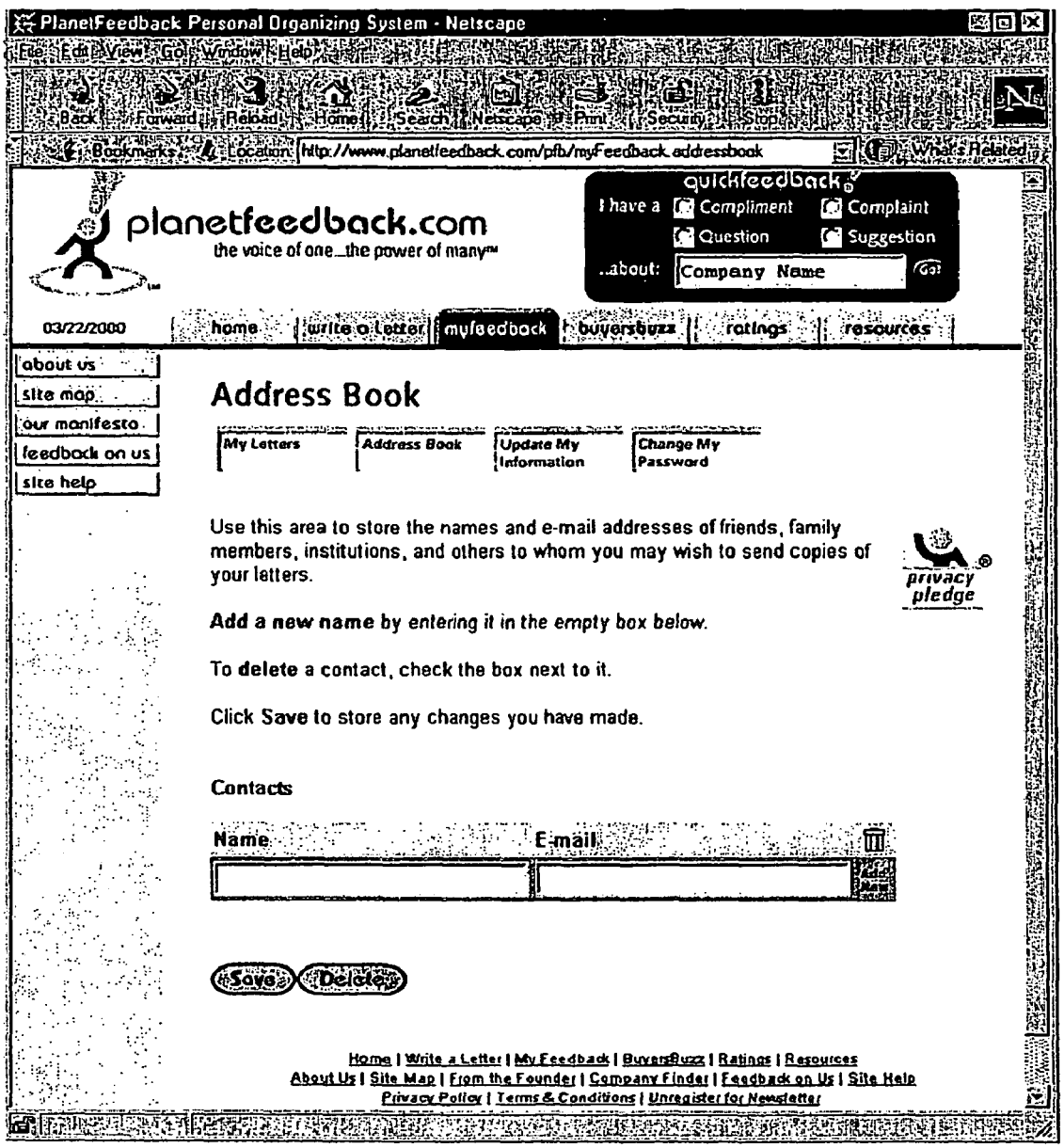
FIG. 14 is an exemplary user interface that may be used by a consumer to access a private address book generated during the consumer feedback communication process.

FIG. 14 is an exemplary user interface that may be used by a consumer to access a private address book generated during the consumer feedback communication process. As described above with reference to FIG. 10, the consumer's private address book is automatically updated with contact information for businesses to whom a letter has previously been written as well as contact information for those individuals who have received a copy of the letter. By directly accessing this address book, the consumer may add, modify, or delete contact information (e.g., an electronic mail address) associated with a particular individual. As shown, to add a contact a new name and associated contact information (e.g., electronic mail address) may be supplied by the consumer. In addition, a consumer may delete a contact by selecting a box next to the entry. Once the consumer has modified his or her private address book to his or her satisfaction, the consumer may save the changes made to the address book.

As described above, the feedback ratings (including those directed to resolution of the situation that prompted the feedback) are collected via consumer input. These feedback ratings, obtained feedback data, and other consumer or business data may be supplied upon demand or on a regular basis to various businesses (e.g., via a digital data structure). In addition, these ratings may be published for the benefit of the consumer. In this manner, each consumer may benefit from the experiences of other consumers.

Figure 15:
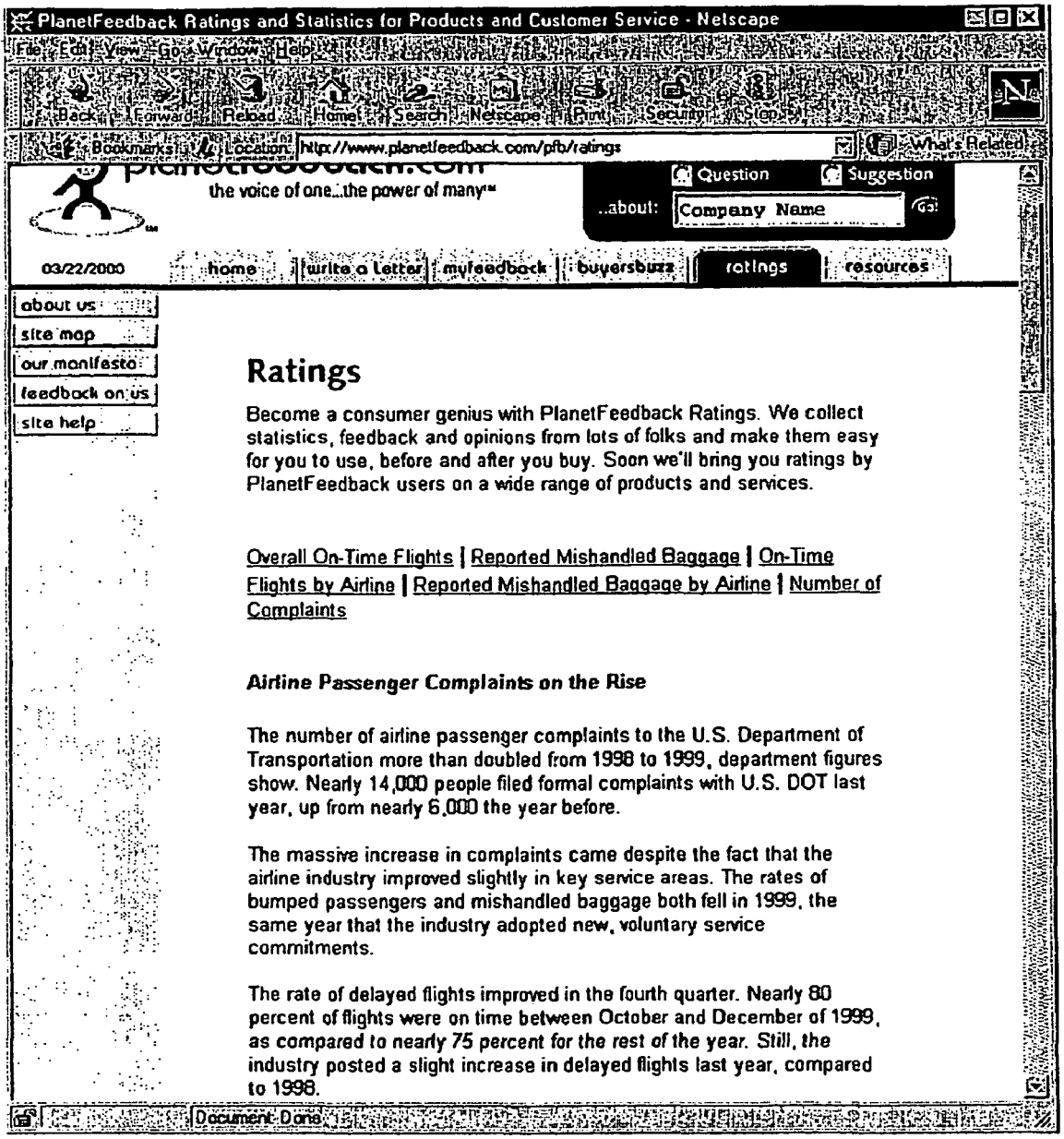
FIG. 15 is an exemplary user interface that may be used by a consumer to access ratings obtained from numerous consumers during the feedback communication and response process.

FIG. 15 is an exemplary user interface that may be used by a consumer to access ratings obtained from numerous consumers during the feedback communication and response process. In this example, ratings obtained in relation to the airline industry were compiled and organized for easy access by consumers. Thus, a consumer may access information related to overall on-time flights, reported mishandled baggage, on-time flights by airline, reported mishandled baggage by airline, and number of complaints as indicated by the corresponding hypertext links in FIG. 15.

In addition to the feedback data (e.g., ratings) obtained from the consumer, the feedback data (and other information) obtained from the consumer during the feedback process may be combined and interpreted to create additional consumer data. For instance, the feedback data obtained directly and indirectly from the consumer may be used to create one or more indices that profile the consumer. Once created, these indices may be transmitted to businesses or industries that wish to receive this valuable consumer data.

Figure 16:
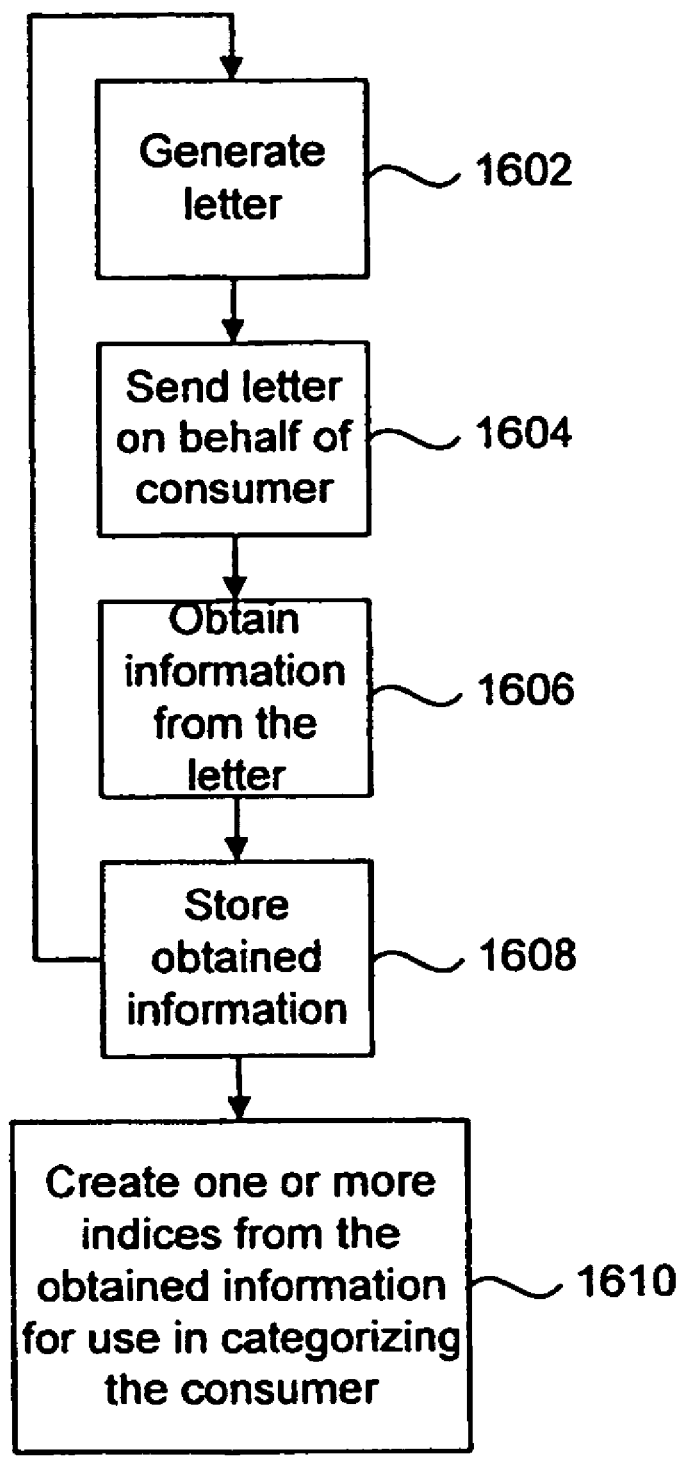
FIG. 16 is a process flow diagram illustrating one method of collecting consumer data during the feedback process in accordance with an embodiment of the invention.

FIG. 16 is a process flow diagram illustrating a general method of collecting consumer data during the feedback process in accordance with an embodiment of the invention. The consumer data may be obtained as a result of a single letter generated and transmitted by a consumer. In addition, valuable consumer data may be obtained by compiling data over multiple feedback instances for a particular consumer. For instance, data may compiled within a particular industry for a consumer to create an accurate consumer profile. Thus, when a letter is generated at block 1602, the letter is sent on behalf of the consumer at block 1604. Information provided in the letter is obtained (e.g., from the letter) at block 1606 and stored for future data analysis at block 1608. This process is repeated as shown at blocks 1602 through 1608 for each letter sent by a consumer. One or more indices are then created from the obtained information at block 1610 in order to categorize the consumer according to a consumer profile. The indices may then be associated with a particular feedback communication as well as a specific consumer. Once the consumer is profiled, this consumer data is stored for transmission to interested businesses and industries. Moreover, it is important to note that such market research data may be obtained from multiple consumer feedback flows associated with a plurality of consumers. Each feedback communication. Accordingly, powerful indices may be developed that reflect a consumer's present and future value to a particular business, industry, or product category.

Figure 17:
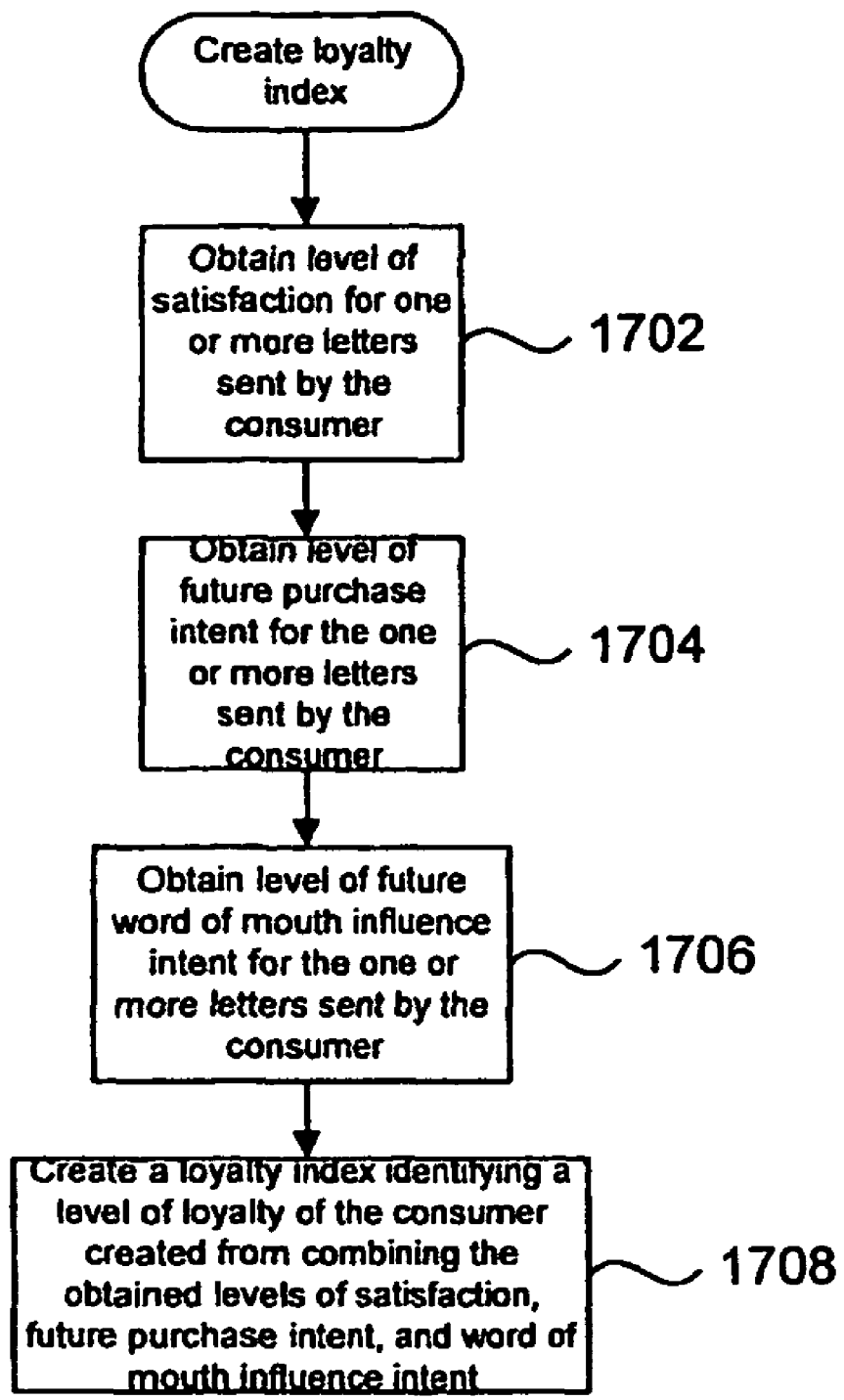
FIG. 17 is a process flow diagram illustrating one method of generating a loyalty index identifying a level of loyalty of the consumer in accordance with an embodiment of the invention.
Figure 18:
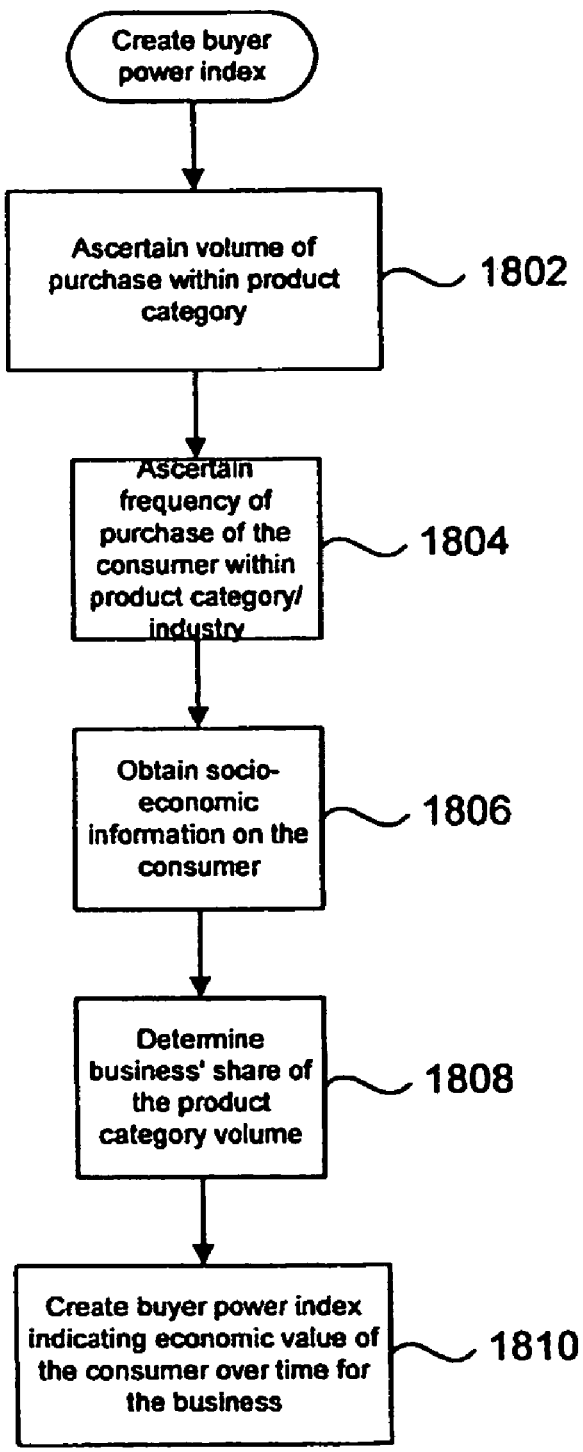
FIG. 18 is a process flow diagram illustrating one method of generating a buyer power index indicating an economic value of a consumer over time for a business.

Information that is obtained and used for consumer profiling may be obtained directly from the consumer as well as indirectly from the consumer. FIG. 17 and FIG. 18 present several methods that may be performed to generate consumer data from information obtained directly from the consumer.

Figure 19:
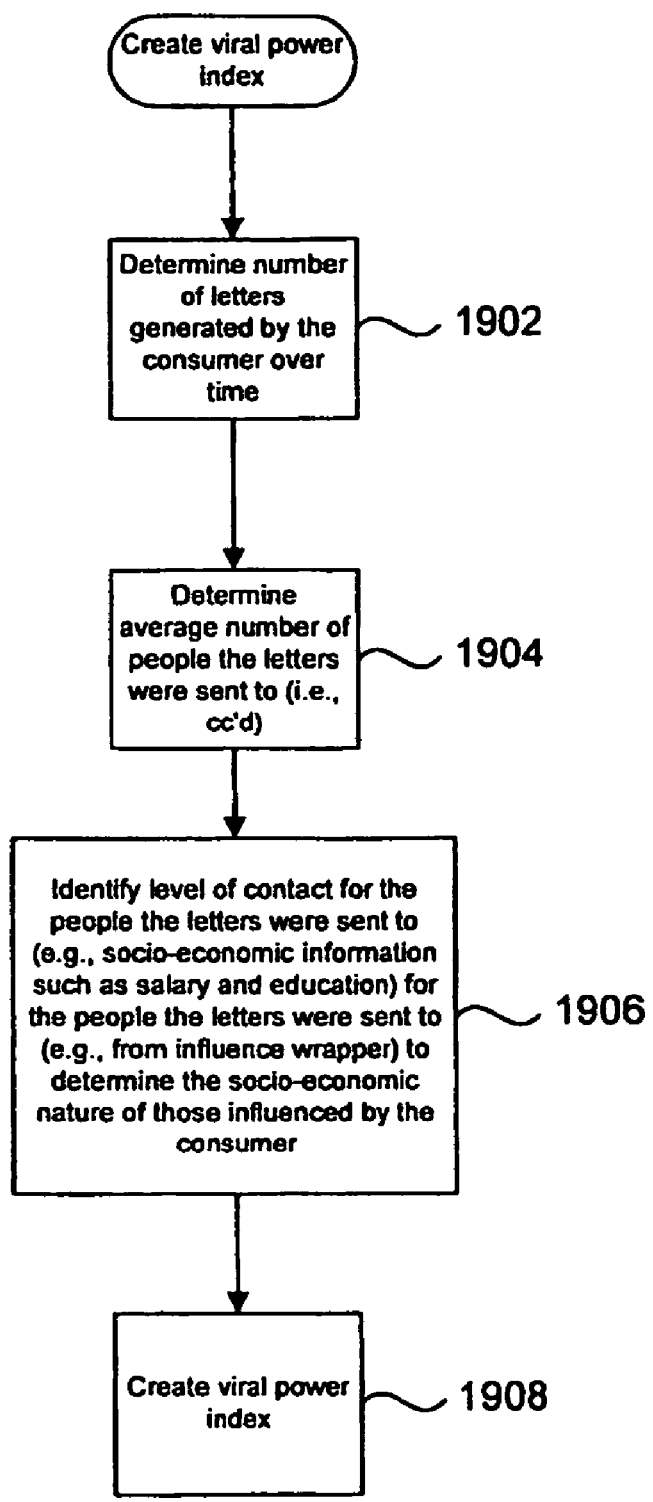
FIG. 19 is a process flow diagram illustrating one method of generating a viral power index indicating a word of mouth impact of the consumer.

FIG. 19 presents a method of generating consumer data from information obtained indirectly from the consumer (i.e., via the letter generation process).

Businesses often want to identify consumers who are loyal consumers. FIG. 17 is a process flow diagram illustrating one method of generating a loyalty index identifying a level of loyalty of the consumer in accordance with an embodiment of the invention. As described above, feedback ratings are preferably obtained from the consumer after a feedback response has been received from a business as well as at the initial letter writing stage. Thus, the data acquisition process is both proactive and reactive. In addition, feedback ratings may be obtained after a predetermined period of time (e.g., 30 days) when a feedback response is not provided by the business. These ratings are then used to create a loyalty index identifying a level of loyalty of the consumer. As shown at block 1702 a satisfaction rating associated with the letter sent by the consumer is obtained. In addition, a future purchase intent rating is obtained at block 1704. Similarly, a future word of mouth influence intent rating is obtained at block 1706. The loyalty index is then created at block 1708 by combining these three feedback ratings. Once generated, the loyalty index serves as an approximation of the strength of the bond between the consumer and the business (i.e., marketer). For instance, the loyalty index may be used to classify a consumer as a loyal consumer, a favorable consumer, an indifferent consumer, or an at risk consumer.

In addition to identifying loyal consumers, businesses typically are interested in identifying those consumers who have the economic ability to purchase various goods and/or services. FIG. 18 is a process flow diagram illustrating one method of generating a buyer power index indicating an economic value of a consumer over time for a business or industry. Economic value is classified by creating a buyer power index across the volume and/or frequency of purchase within the particular industry or product category. As one example, a consumer may indicate the number of times the consumer flies a year. As another example, a consumer may indicate that he or she purchases a particular brand of cereal once a week and that this cereal box is a large box rather than a small box. In addition, the buyer power index factors in the business' share of this category volume as well as known socio-economic information on the consumer. As shown at block 1802, the volume of purchase within a particular product category is ascertained. In addition, the frequency of purchase of the consumer within the product category or industry is ascertained at block 1804. Moreover, socio-economic information received from the consumer during the registration process is obtained at block 1806. As described above with reference to FIG. 12, this socioeconomic information may include information such as gender, salary, occupation, and education level. In addition, the buyer power index may include the business' share of the category or industry volume which is obtained at block 1808. Thus, a brand loyalty may effectively be obtained by combining the consumer purchase volume and business' share of this category or industry volume. A buyer power index is then created at block 1810 which indicates a consumer's economic value to a particular business or industry over time. For instance, the buyer power index may serve to classify the consumer into one of several categories. Exemplary categories include high brand loyalty/high category volume, high brand loyalty/low category volume, low brand loyalty/high category volume, and low brand loyalty/low category volume.

As described above, market research data may be generated over a cross section of consumers. As one example, market research data may be generated over a particular geographic region. As another example, market research data may be generated for consumers within a particular cross section of the population (e.g., income level, education level).

Although the above description generally describes the collection of consumer data relating to consumers generating feedback communications using the present invention, business data relating to the targeted businesses may also be generated. The business data may identify or quantify a variety of business practices followed by the business. In addition, the business data may identify the industry of the business. Moreover, the business data may quantify the number of compliments or complaints generated within a particular industry. Depending upon the user interfaces used to generate the feedback communications, a variety of business data may be obtained from the feedback communications.

While valuable information is obtained directly from user input that is consciously provided by a willing consumer, some information may be inferred from the behavior of the consumer. Thus, valuable consumer data may be gathered and measured based upon this consumer behavior. FIG. 19 is a process flow diagram illustrating one method of generating a viral power index indicating a word of mouth impact of the consumer. More particularly, the viral power of a consumer is classified by a creating a viral power index across the number of individuals to whom the feedback communication was transmitted and the number of feedback instances captured via the web site. As shown at block 1902, the number of letters generated by the consumer over time is ascertained. This number may reflect all letters generated by the consumer as well as the number of letters generated within a particular product category or industry. From the contact information associated with each letter, the average number of people who received a letter from the consumer may be ascertained at block 1904. More particularly, it may be desirable to look at those individuals who received a "carbon copy" of the letter rather than those who were addressed directly in the letter. In addition, a level of contact for the people to whom the letters were transmitted may be obtained or inferred from available information at block 1906. In other words, socioeconomic information previously obtained from the consumer as well as from system influence databases may be applied to determine or infer the socio-economic nature of those influenced. Thus, socio-economic factors associated with the consumer such as gender, occupation, salary, and education may be applied to infer the socio-economic nature of those influenced. Of course, socio-economic information that is available for those individuals who received the feedback communication may also be applied. For instance, a job or political title may indicate a certain socio-economic status. A viral power index indicating an approximation of the word of mouth impact of the consumer over time is then generated at block 1908 from the information obtained at blocks 1902, 1904, and 1906. Exemplary viral power classifications include possible combinations of highly viral, moderately viral, and minimally viral with high, low, or moderate income (as well as no income available).

Through tracking the type and number of individuals to whom consumer feedback communication is sent, the number of letters that are sent by a given consumer (e.g., within a particular industry), and the cascading effect of word of mouth influence, the present invention identifies the most influential consumers within particular product categories or industries. This viral index may be used to profile and direct various communications to individuals based upon their ability to influence the purchase and consumption patterns of others both on and off the web. In addition, the feedback data (e.g., ratings) as well as the feedback type (e.g., complaint or compliment) may be used to ascertain whether the individual is likely to positively or negatively influence other consumers or potential consumers. For instance, it may be desirable to identify individuals who pose a large threat to negatively influencing other consumers as well as to identify individuals who can be expected to leverage positive word of mouth information and marketing messages. Moreover, the viral index may also be used to build panels of expert users for product testing and identify candidates that can be given free product or services to generate positive word of mouth communication.

The present invention captures and generates valuable consumer data through a variety of processes. The present invention captures feedback data reflecting the attitudes from consumers as a result of a "feedback event" via the consumer feedback communication and response processes. In addition, the obtained data reflecting the purchasing and communications behavior of the consumer is used to develop powerful indices of financial and word of mouth impact. This enables businesses to use this information to their economic advantage, as well as to harness the power of word of mouth influence of today's technologically sophisticated consumer.

Figure 20:
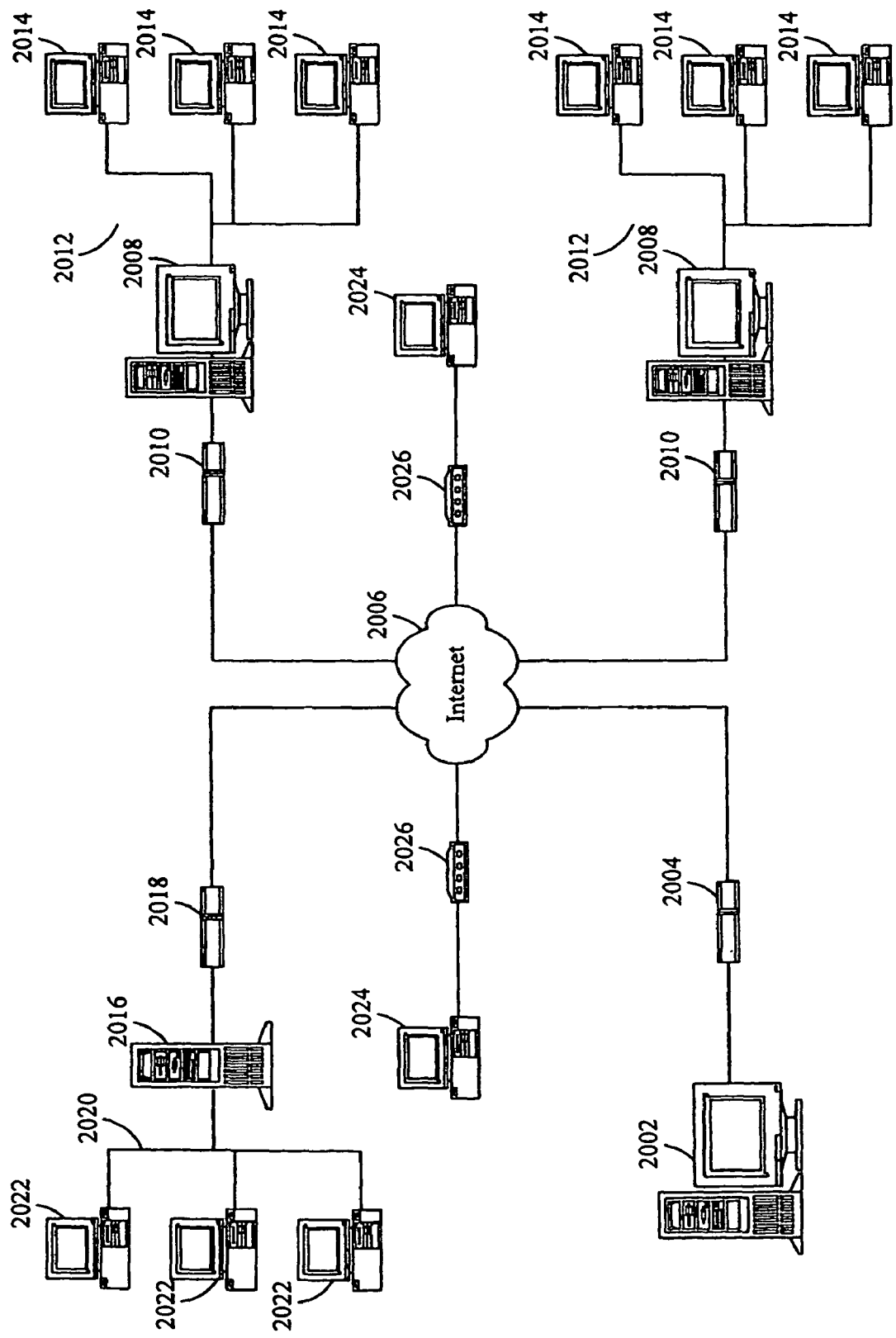
FIG. 20 is a diagram illustrating an exemplary system in which the present invention may be implemented.

FIG. 20 is a block diagram of a hardware environment in which the various embodiments of the present invention may be implemented. The web site at which communications between consumers and businesses are facilitated according to the invention is located on a server 2002 which is connected by a router 2004 to the Internet 2006. Businesses (represented by servers 2008) may also be connected to the Internet via routers 2010 in order to receive the transmission of data and letters from the server 2002. Business servers 2008 may have networks 2012 associated therewith interconnecting a plurality of personal computers or work stations 2014. Consumers (represented by computers 2022 and 2024) may be connected to the Internet in a variety of ways. For example, a consumer may be connected from his home via a modem 2026, or from his workplace via a network 2020, a file server 2016, and a router 2018. It will be understood that, according to various embodiments of the invention, consumers may gain access to the web site on server 2002 via a variety of hardware configurations. Similarly, businesses may be coupled to the web site on server 2002 in order to receive the transmission of communications as well as data from the web site. For example, a business may consist of an individual on his home computer 2024. Similarly, a consumer may be an employee who accesses the web site from his computer 2014 at his place of employment which is a business. It will also be understood that the hardware environment of FIG. 20 is shown for illustrative purposes and that a wide variety of hardware environments may be employed to implement the various embodiments of the present invention. It should also be understood that specific embodiments of the methods and processes described herein are implemented as computer program instructions, i.e., software, in the memory of server 2002.

Various embodiments of the invention can also be embodied as computer readable code on a computer readable medium. The computer readable medium is any data storage device that can store data which can thereafter be read by a computer system. Examples of the computer readable medium include read-only memory, random-access memory, CDROMs, magnetic tape, and optical data storage devices.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is based upon the generation and transmission of a letter by a consumer, preferably in the form of an electronic mail. However, it should be understood that the present invention is not limited to this arrangement, but instead would equally apply regardless of the mode of transmission. Accordingly, the present embodiments are to be considered as illustrative and not restrictive, and the invention is not to be limited to the details given herein, but may be modified within the scope and equivalents of the appended claims.

What is claimed is:

1. A method to collect data associated with a consumer through generation of a consumer feedback communication via a wide area network, the method comprising:
   in response to input from a consumer via the wide area network, identifying a business to which the consumer feedback communication is to be directed;
   obtaining feedback data relating to the business from the consumer via the wide area network;
   automatically generating at least a portion of the consumer feedback communication using the feedback data;
   addressing the consumer feedback communication to an individual associated with the business;
   addressing the consumer feedback communication to a person identified by the consumer and to one or more additional individuals;
   determining using a processor word of mouth impact of the consumer from information associated with addressing the consumer feedback communication to the person and to the one or more additional individuals, wherein determining the word of mouth impact of the consumer comprises ascertaining a number of individuals carbon copied on the consumer feedback communication;
   transmitting the consumer feedback communication to the individual, to the person identified by the consumer, and to the one or more additional individuals;
   determining using a processor a socio-economic identification for the consumer; and
   storing in a memory an indication that the socio-economic identification is associated with the person identified by the consumer.

2. The method as recited in claim 1, wherein the collected data includes data quantifying past experiences of the consumer.

3. The method as recited in claim 1, wherein the collected data includes data quantifying future intentions of the consumer.

4. The method as recited in claim 1, wherein the collected data includes data quantifying past purchases by the consumer of products and/or services rendered by the business.

5. The method as recited in claim 1, wherein the collected data includes data indicating economic value of the consumer over time for the business.

6. The method as recited in claim 1, further comprising: selecting an industry for which data associated with the consumer is to be collected; wherein collecting data comprises obtaining consumer data relating to the selected industry from the obtained feedback data.

7. The method as recited in claim 6, further comprising: providing the collected data to one or more businesses within the selected industry.

8. The method as recited in claim 1, further comprising: associating the collected data with the consumer feedback communication.

9. The method as recited in claim 1, further comprising: providing the collected data to the business.

10. The method as recited in claim 1, further comprising:
obtaining socio-economic data associated with the consumer, wherein the socioeconomic data includes at least one of income of the consumer and occupation of the consumer; and
determining an economic value of the consumer to the business from the socioeconomic data.

11. The method as recited in claim 1, further comprising:
obtaining socio-economic data associated with the consumer, wherein the socioeconomic data includes at least one of income of the consumer and occupation of the consumer; and
combining the collected data and the socio-economic data to obtain one or more indices associated with the consumer.

12. The method as recited in claim 11, wherein the one or more indices includes a loyalty index indicating a level of loyalty of the consumer to the business.

13. The method as recited in claim 11, wherein the one or more indices includes a buyer power index indicating a level of purchase power of the consumer.

14. The method as recited in claim 1, wherein addressing the consumer feedback communication to the one or more additional individuals comprises: addressing a carbon copy of the consumer feedback communication to the one or more additional individuals.

15. The method as recited in claim 1, wherein determining the word of mouth impact comprises ascertaining a total number of individuals carbon copied for the consumer feedback communications initiated by the consumer.

16. The method as recited in claim 15, further comprising:
determining a number of consumer feedback communications initiated by the consumer; and
ascertaining an average number of individuals carbon copied by the consumer from the number of consumer feedback communications initiated by the consumer and the total number of individuals carbon copied for the consumer feedback communications initiated by the consumer.

17. The method as recited in claim 1, further comprising: addressing the consumer feedback communication to a second set of one or more additional individuals; wherein collecting data associated with the consumer further comprises obtaining information related to addressing the consumer feedback communication to the second set of one or more additional individuals.

18. The method as recited in claim 17, wherein determining the word of mouth impact of the consumer comprises:
ascertaining a number of individuals carbon copied on the consumer feedback communication; and
ascertaining a number of individuals in the second set of one or more additional individuals.

19. The method as recited in claim 18, wherein the second set of one or more additional individuals include direct addressees of the consumer feedback communication.

20. The method as recited in claim 19, further comprising:
for one or more additional consumer feedback communications initiated by the consumer, repeating the identifying, obtaining, generating, collecting, addressing the consumer feedback communication to individual associated with the business, and addressing the consumer feedback communication to the one or more additional individuals; and
ascertaining a total number of individuals carbon copied for the one or more additional consumer feedback communications initiated by the consumer;
ascertaining a total number of individuals in the second set of one or more additional individuals for the additional consumer feedback communications initiated by the consumer; and
adding the total number of individuals carbon copied and the total number of individuals in the second set to obtain a total number of individuals.

21. The method as recited in claim 20, further comprising:
determining a total number of the consumer feedback communications initiated by the consumer; and
ascertaining an average number of individuals who received at least one of the consumer feedback communications initiated by the consumer from the total number of consumer feedback communications initiated by the consumer and the total number of individuals.

22. The method as recited in claim 1, further comprising: obtaining socio-economic data associated with the consumer; wherein determining the word of mouth impact of the consumer further comprises using the socio-economic data to infer a socio-economic nature of the person and the one or more additional individuals to whom the consumer feedback communication has been addressed.

23. The method as recited in claim 22, wherein the socio-economic data includes information indicating at least one of salary, job title or education level of the consumer.

24. The method as recited in claim 22, wherein the socio-economic data includes at least one of a title, a political status, or an associated special interest group.

25. A system to collect data associated with a consumer via a wide area network, comprising:
a memory; and
a processor to:
in response to input from the consumer via the wide area network, identify a business to which the consumer is to provide feedback;
obtain feedback data relating to the business from the consumer via the wide area network;
automatically generate at least a portion of a consumer feedback communication using the feedback data;
address the consumer feedback communication to a person identified by the consumer and to one or more additional individuals;
determine word of mouth impact of the consumer from information associated with addressing the consumer feedback communication to the person and to the one or more additional individuals, wherein determining the word of mouth impact of the consumer comprises ascertaining a number of individuals carbon copied on the consumer feedback communication;
transmit the consumer feedback communication to an individual associated with the business, to the person identified by the consumer, and to the one or more additional individuals;
determine a socio-economic identification of the consumer; and
associate the socio-economic identification is associated with the person identified by the consumer, the person being different than the consumer.

26. A system as defined in claim 25, wherein the person is a first person and wherein the processor is to:
transmit the consumer feedback communication to a second person; and
associate the socio-economic identification with the second person.

* * * * *